(12) United States Patent
Mertens et al.

(10) Patent No.: US 9,382,897 B2
(45) Date of Patent: Jul. 5, 2016

(54) WIND TURBINE WITH A CENTRIFUGAL FORCE DRIVEN ADJUSTABLE PITCH ANGLE AND CABLES RETAINING BLADES IN A HUB

(75) Inventors: Sander Mertens, Voorburg (NL); Eline Maria Mertens, Voorburg (NL)

(73) Assignee: WINDCHALLENGE B.V., Rotterdam (NL)

( * ) Notice: Subject to any disclaimer, the term of this patent is extended or adjusted under 35 U.S.C. 154(b) by 872 days.

(21) Appl. No.: 13/700,911

(22) PCT Filed: May 31, 2011

(86) PCT No.: PCT/NL2011/050383
§ 371 (c)(1),
(2), (4) Date: Nov. 29, 2012

(87) PCT Pub. No.: WO2011/162599
PCT Pub. Date: Dec. 29, 2011

(65) Prior Publication Data
US 2013/0071244 A1    Mar. 21, 2013

(30) Foreign Application Priority Data

May 31, 2010 (NL) ...................................... 2004789
Jan. 5, 2011 (NL) ...................................... 2005954

(51) Int. Cl.
*F03D 7/02* (2006.01)
*F03D 1/06* (2006.01)
*F03D 9/00* (2016.01)

(52) U.S. Cl.
CPC ............ *F03D 1/0691* (2013.01); *F03D 7/0204* (2013.01); *F03D 7/026* (2013.01);
(Continued)

(58) Field of Classification Search
CPC ... F03D 1/0691; F03D 7/0204; F03D 7/0224; F03D 7/0256; F03D 7/026
USPC .......................................................... 290/55
See application file for complete search history.

(56) References Cited

U.S. PATENT DOCUMENTS 1,735,822 A    11/1929 Wernicke
1,793,321 A    2/1931 Jacobs
(Continued)

FOREIGN PATENT DOCUMENTS

FR    2919902 A1    2/2009
GB    264099 A    1/1927
(Continued)

OTHER PUBLICATIONS

English Machine Translation of FR 2919902, dated Nov. 19, 2012.
(Continued)

*Primary Examiner* — Nathaniel Wiehe
*Assistant Examiner* — Woody A Lee, Jr.
(74) *Attorney, Agent, or Firm* — Hoffmann & Baron, LLP

(57) ABSTRACT

A wind turbine includes rotor blades pivotably mounted in a gondola such that the pitch of the blades is adjustable, and pitch adjustment mounted coaxially and pivotably on the rotor axle such that the pitch adjustment are rotatable relative to that axle. The gondola is furthermore connected via torsion positioning to the axle, such that it can rotate relative to the pitch adjustment to adjust the pitch of the rotor blades. The wind turbine may also include a cable for each rotor blade, which are each with one end connected to the blade and with their opposite end to the rotor axle, such that the blades are supported by the cables against movement in the radially outward direction.

15 Claims, 12 Drawing Sheets

(52) U.S. Cl.
CPC ............ *F03D 7/0224* (2013.01); *F03D 7/0256* (2013.01); *F03D 9/002* (2013.01); *F05B 2260/75* (2013.01); *F05B 2260/77* (2013.01); *F05B 2260/85* (2013.01); *Y02B 10/30* (2013.01); *Y02E 10/721* (2013.01); *Y02E 10/723* (2013.01)

(56) References Cited

U.S. PATENT DOCUMENTS

| | | | | |
|---|---|---|---|---|
| 2,639,775 | A | * | 5/1953 | Hunt .................... B64C 27/41 416/148 |
| 2,874,787 | A | | 2/1959 | Battenberg et al. |
| 2,970,652 | A | * | 2/1961 | Belanus ................ F03D 7/0224 416/152 |
| 4,335,996 | A | | 6/1982 | Ross |
| 4,444,543 | A | | 4/1984 | Wilks et al. |
| 4,495,423 | A | | 1/1985 | Rogers |
| 4,701,104 | A | | 10/1987 | Cohen |
| 4,792,281 | A | * | 12/1988 | Coleman ............... F03D 7/0224 416/135 |
| 8,622,705 | B2 | * | 1/2014 | Bornay Rico ......... F03D 7/0224 416/157 R |
| 2008/0253892 | A1 | | 10/2008 | Dehlsen |
| 2011/0135471 | A1 | | 6/2011 | Wangford |
| 2012/0263594 | A1 | * | 10/2012 | Winkelmann ......... F03D 11/028 416/174 |

FOREIGN PATENT DOCUMENTS

| | | |
|---|---|---|
| JP | 2009 299518 A | 12/2009 |
| WO | WO 83/00899 A1 | 3/1983 |
| WO | WO 2006/097836 A2 | 12/2006 |
| WO | WO 2008/153423 A2 | 12/2008 |
| WO | WO 2009/056702 A2 | 5/2009 |

OTHER PUBLICATIONS

English Machine Translation of JP 2009-299518.

English Machine Translation of WO 2009/056702, dated Nov. 19, 2012.

* cited by examiner

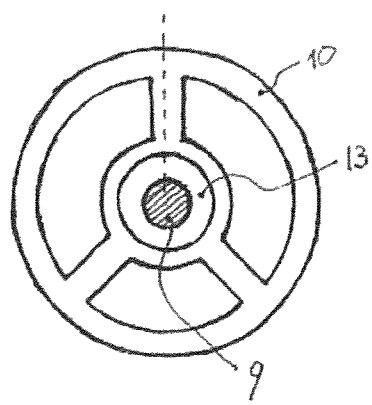
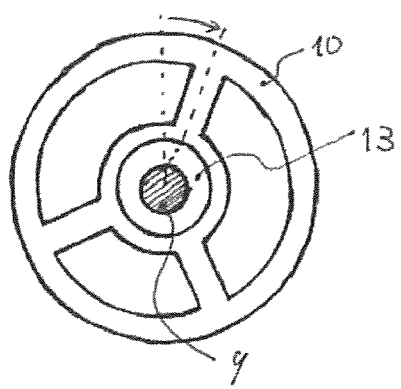
Fig. 7A
Fig. 7B

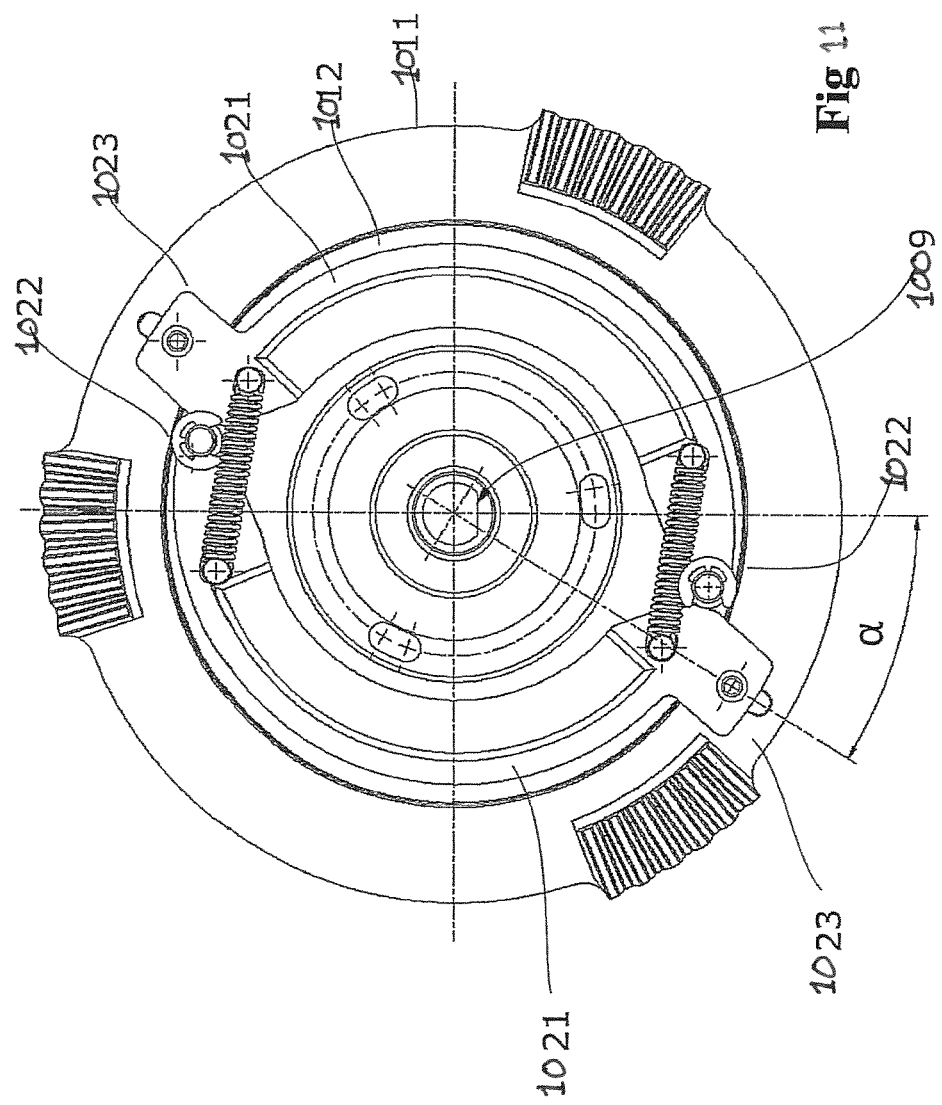

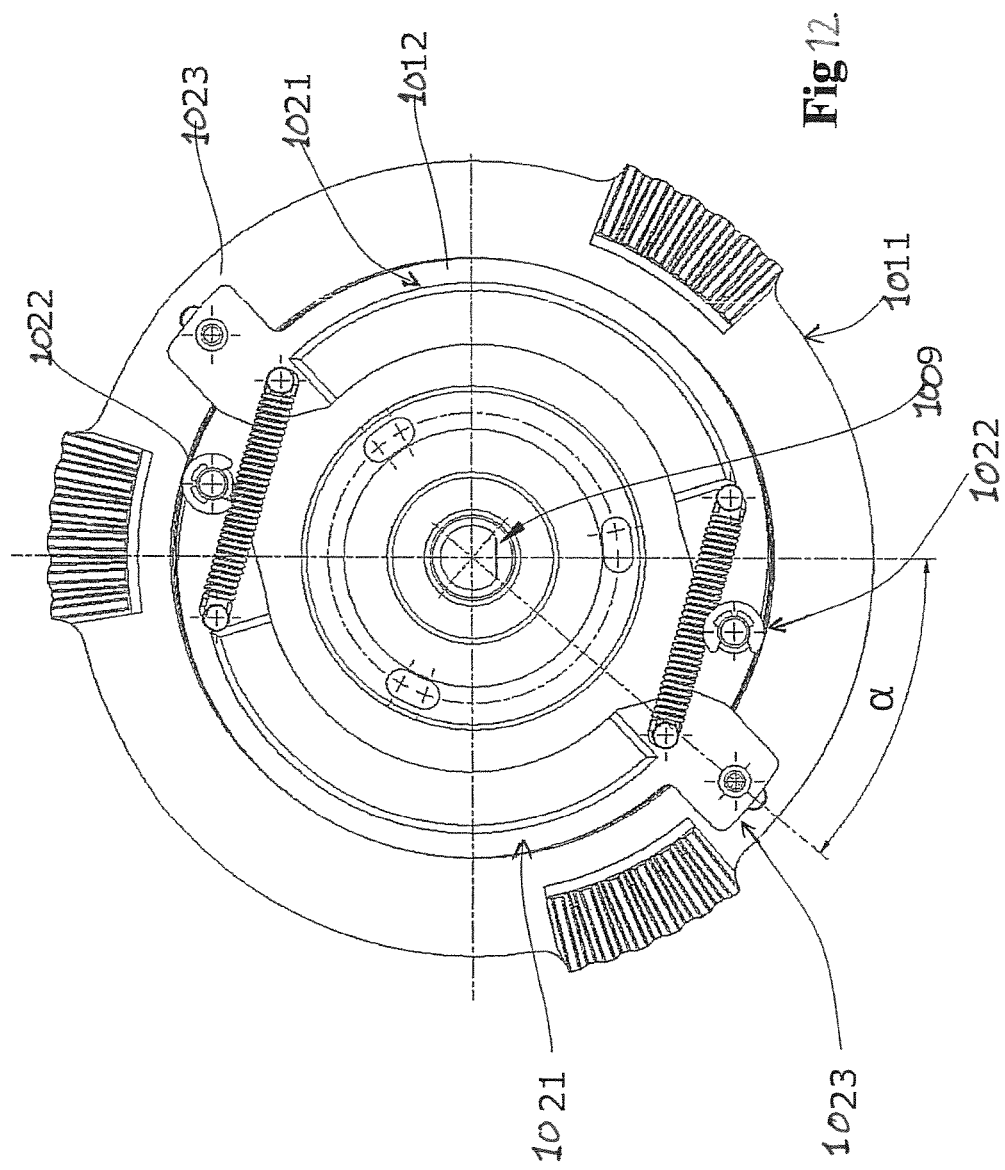

WIND TURBINE WITH A CENTRIFUGAL FORCE DRIVEN ADJUSTABLE PITCH ANGLE AND CABLES RETAINING BLADES IN A HUB

CROSS-REFERENCE TO RELATED APPLICATIONS

This application is the National Stage of International Application No. PCT/NL2011/050383, filed May 31, 2011, which claims the benefit of Netherlands Application Nos. 2004789, filed May 31, 2010, and 2005954, filed Jan. 5, 2011, the contents of all of which are incorporated by reference herein.

FIELD OF THE INVENTION

The present invention is directed to a wind turbine. More particularly, the present invention is directed to a wind turbine with a centrifugal force driven adjustable pitch angle and cables retaining blades in a hub.

BACKGROUND OF THE INVENTION

Traditionally wind turbines have been placed in rural areas where they can take advantage of strong winds with a low turbulence level. The realization of the need for generating energy from sustainable sources expands, there is more interest in smaller wind turbines for use in areas not conventionally considered as suitable, such as urban and peri-urban zones.

The urban environment has unique challenges to the wind turbines. First of all, the overall wind speed is lower than the wind speed in open rural areas. A wind turbine for use in an urban area should therefore have a low cut in speed, i.e. the lowest wind speed at which the wind turbine begins producing usable power, and a low rated wind speed, i.e. the speed at nominal operating conditions. Furthermore, the presence of buildings and other structures increases the turbulence level of the flow. Considering that the wind energy capture of a wind turbine varies with the cube of the velocity of the wind, a machine designed to operate under certain conditions may, within seconds, undergo stresses much greater than those for which it was designed.

Also, since free space in urban areas is limited, turbines are commonly mounted on buildings. But most buildings are not specifically designed for supporting wind turbines, and are not suited for supporting heavy constructions or absorbing vibrations.

Manufacturing machines robust enough to withstand turbulent wind flows and maximum wind flows during storms makes wind turbines costly. Furthermore, the robust type machines tend to get very heavy and are therefore less suitable for mounting on buildings.

It is also known to provide wind turbines with a system which feathers the blades of the wind turbine, i.e. pitches the blades so as to reduce their lift capacity to reduce the speed of the turbine or to even shut down the turbine during high wind speeds. The known systems are complicated and elaborate, and are therefore unsuited for cost efficient small wind turbines. However, small wind turbines without a feathering system suffer from severe wind loads during storms, which asks for heavy support structures of the rotor. Such small wind turbines are therefore also costly.

SUMMARY OF THE INVENTION

It is an object of the first aspect of the invention to provide an alternative wind turbine for use in urban areas which preferably alleviates one or more of the above mentioned problems. It is a further object of the first aspect of the invention to provide light, compact wind turbine, equipped with a cost effective system that feathers the blades and preferably minimize the transfer of vibrations to the building.

According to a second aspect, the invention relates to a bearing for supporting the blades in a wind turbine.

Traditionally wind turbines have been placed in rural areas where they can take advantage of strong winds with a low turbulence level. The realisation of the need for generating energy from sustainable sources expands, there is more interest in smaller wind turbines for use in areas not conventionally considered as suitable, such as urban and peri-urban zones.

The urban environment poses unique challenges for the wind turbines. First of all, the overall wind speed is lower than the wind speed in open rural areas. Furthermore, the presence of buildings and other structures increases the turbulence level of the flow. Also, since free space in urban areas is limited, turbines are commonly mounted on buildings. Most buildings are however not specifically designed for supporting wind turbines, and are not suited for supporting heavy constructions or absorbing vibrations.

Manufacturing wind turbines robust enough to withstand turbulent wind flows and maximum wind flows during storms makes wind turbines costly. Furthermore, the robust type machines tend to get very heavy and are therefore less suitable for mounting on buildings.

It is known to provide wind turbines with a pitching system which feathers the blades of the wind turbine, i.e. pitches the blades so as to reduce their lift capacity, to reduce the speed of the turbine or to even shut down the turbine during high wind speeds. The known systems are relatively heavy and expensive. Use of these systems in small wind turbines thus has a negative impact on the efficiency in generating energy due to their weight, and on the cost efficiency, due to their price. Furthermore, the pitching system requires the blades of the wind turbine to be mounted pivotably in the nacelle, which requires complicated constructions typically comprising roller bearings for supporting the blades. These types of bearings are expensive.

However, small wind turbines without a pitching system suffer from severe wind loads during storms, which ask for heavy support structures of the rotor. Such small wind turbines are therefore also costly.

It is an object of the second aspect of the invention to provide an alternative wind turbine for use in urban areas which preferably alleviates one or more of the above mentioned problems. It is a further object of the second aspect of the invention to provide light, compact wind turbine, comprising a system for pitching the blades, which system is preferably simple in construction and/or cost efficient in production.

According to the first aspect of the present invention this object is achieved by a wind turbine of the present invention. A wind turbine according the first aspect includes an electrical generator for generating electrical energy. The wind turbine comprises a nacelle, a mast, for pivotably supporting the nacelle, and a rotor which is pivotably mounted in the nacelle such that the rotor can be driven by the wind in a rotational direction about a rotational axis of the wind turbine rotor.

The rotor of a wind turbine according to the first aspect of the invention comprises a rotor axle, a gondola, two or more rotor blades, pitch adjustment devices, centrifugal positioning devices and torsion positioning devices.

The rotor axle, for driving the generator, is pivotably supported in the nacelle. Thus, the rotor is pivotably supported in the nacelle by the rotor axle. The rotor axle coincides with the rotational axis of the rotor, i.e. the rotor axle has a central longitudinal axis about which it rotates in mounted condition, and which coincides with the rotational axis of the rotor. During use, the rotational axis of the rotor is essentially parallel to the wind flow.

The gondola of a wind turbine according to the first aspect of the invention is coaxially and pivotably connected to the rotor axle, such that the gondola is pivotable about the rotational axis of the rotor. The gondola supports two or more rotor blades such that they extend in a radial direction relative to the rotational axis of the rotor.

The rotor blades are pivotably mounted in the gondola such that the pitch of the rotor blades is adjustable. To alter the pitch of a rotor blade, the blade is pivoted about its longitudinal axis. Adjusting the pitch of a blade, or its orientation, alters the aerodynamics and the efficiency of the blade, and thus allows for controlling the speed of the rotor and the transformation of wind energy into mechanical energy. The pivotably mounted rotor blades cooperate with the pitch adjustment devices of the rotor which control the pitch of the blades.

The pitch adjustment devices of a wind turbine according to the first aspect of the invention are mounted coaxially and pivotably on the rotor axle such that the pitch adjustment devices are rotatable about the rotational axis of the rotor. The pitch adjustment devices interact with the pivotable mounted rotor blades. The pitch of the rotor blades is adjusted by rotating the pitch adjustment devices and the gondola relative to each other about the rotational axis of the rotor.

The position of the pitch adjustment devices relative to the rotational axis of the rotor is controlled by the centrifugal positioning devices. The centrifugal positioning devices are provided for rotating the pitch adjustment devices about the rotor axis. The centrifugal positioning devices comprise at least two centrifugal bodies and resilient devices. The two or more centrifugal bodies are each movably connected to the rotor, preferably to the rotor axle, for movement between a first position near the rotational axis of the rotor and a second position at a distance from the rotational axis of the rotor. The resilient devices force the centrifugal bodies in the position near the rotational axis, such that when the rotor is driven by the wind and the rotational speed of the rotor axle surpasses a threshold value, a centrifugal force acts on the centrifugal bodies which forces the centrifugal bodies against the resilient force and from their first position towards their second position. The centrifugal bodies are evenly distributed about the rotational axis, such that they do not influence the stability of the rotor when the rotor is driven by the wind.

The two or more centrifugal bodies are connected to the pitch adjustment devices such that when the centrifugal bodies move from their first position to their second position, they rotate the pitch adjustment devices about the rotational axis in a direction contrary to the rotational direction of the rotor. The centrifugal bodies for example comprise one or more pivotably mounted arms, or bodies which are supported via a cam in a camshaft or on a support axle extending in the radial direction. Preferably, the centrifugal bodies are each connected to the pitch adjustment devices via a cam and camshaft connection which transfer the radial movement of the centrifugal bodies in a rotational movement of the pitch adjustment devices.

The position of the gondola relative to the rotational axis of the rotor is controlled by the torsion positioning devices. The torsion positioning devices of the rotor connect the gondola to the rotor axle such that when the rotor is driven by the wind and a torque is generated in the rotor axle, and which is transferred via the torsion devices from the gondola to the rotor axle, the gondola rotates about the rotational axis of the rotor and relative to the pitch adjustment devices in the rotational direction of the rotor.

With a wind turbine according to the first aspect of the present invention, the pitch adjustment devices allow for adjusting the pitch of the rotor blades via centrifugal positioning devices, which are linked to the rotational speed of the rotor, and via torsional positioning devices, which are linked to the torque transferred from the rotor tot the generator.

The pitch adjustment devices enable a small wind load during storms and also provide an overload protection. Thus, the pitch adjustment devices enable the use of a small and light generator, which in turn enables a low cut in speed and a compact and light nacelle. This, in combination with the small wind load during storms, further enables a light and flexible mast that prevents transmission of vibrations from the rotor to the foundation of the mast and attached (building) structures.

By linking both the centrifugal positioning devices and the torsion positioning devices via the pitch adjustment devices to each rotor blades, instead of coupling both positioning devices via separate pitch adjustment devices to each rotor blade, the first aspect of the invention provides a compact, light and cost efficient system for adjusting the pitch of the rotor blades, and thus a compact, light and cost efficient wind turbine.

Furthermore, the pitch adjustment devices, the gondola and the blades are designed such that the pitch adjustment devices pitch all the blades simultaneously and over the same angle. Thus, the wind load on the rotor remains balanced.

The torsion positioning devices regulate the pitch of the blades at a low rotational speed and the centrifugal positioning devices regulate the pitch of the blades at a higher rotational speed. When the speed of the rotor is zero, the rotor blades are positioned in what is called their initial position. When a rotor blade is pitched, it is pivoted about its longitudinal axis over an angle such that the blade in the pitched position is at an angle relative to the same blade when in its initial position. Preferably the maximum pitch positions the blades at an angle of about 90 degrees with the initial position of the blades, such that the faces of the blades are positioned parallel to the wind flow. In this position the blades are feathered, i.e. positioned to minimize their lift capacity and generate minimal or none rotational power. The blades are pitched in this position to prevent heavy winds from overloading the wind turbine.

In a preferred embodiment according to the first aspect of the invention, the torsion positioning devices enable a pitch adjustment of the rotor blades over a first angle, preferably over an angle of 0-30 degrees relative to the blade in its initial position, and the centrifugal positioning devices enable a pitch adjustment of the rotor blades over a second angle, preferably over an angle of 30-90 degrees relative to the blade in its initial position.

Because a wind turbine according to the first aspect of the invention enables the rotor blades to be pitched, the maximum torque provided by the rotor can be limited. A low maximum torque allows for a small and light electrical generator. This in turn allows for a small and light nacelle. Furthermore, a small generator has a low cut in speed and thus the turbine is able to deliver electrical energy at low wind speeds.

In a further embodiment, the torsion positioning devices control the load during normal operating conditions, while the centrifugal positioning system only takes control when the rotational speed comes close to a speed which might damage the wind turbine, for example due to sudden gust of heavy side winds or extreme wind speeds. In this embodiment the torsion positioning devices are able to pitch the blades over an angle of 0 up to about 90 degrees or close thereto, relative to the blade in its initial position. When the blades are pitched over the full angle, they are positioned in the so called feather position. In a preferred embodiment, the torsional devices comprise a gear rack extending in a circumferential direction about the rotational axis of the rotor, and the rotor blades each comprise a bevelled gear for cooperation with the rack. When the gondola is rotated about the rotational axis relative to the pitch adjustment devices, the bevelled gear runs along the gear rack and the pitch of the rotor blade is adjusted. The combination of a gear rack and bevelled gear allows for compact pitch adjustment devices and in addition enable pitching over a great angle.

In a preferred embodiment, the gondola has a central opening in which it receives the rotor axle. The torsion positioning devices furthermore comprise resilient devices, for example a rubber ring, which are mounted in between the rotor axle and the gondola to connect the gondola to the axle. This allows for a secure and stable support of the gondola by the rotor axle. Furthermore, by connecting the gondola via flexible devices to the rotor axle, vibrations in the gondola due to its rotation are dampened.

In a preferred embodiment, the torsion positioning devices comprise resilient devices which have a stiffness which decrease when the torque acting on the resilient devices increases, i.e. digressive resilient. Such torsion positioning devices allow for minimal movement of the gondola relative to the pitch adjustment devices, and thus minimal pitching, of the blades at low wind speed, and increased movement of the gondola relative to the pitch adjustment devices, and thus increased pitching, at higher wind speeds. This is advantageous since at low wind speeds the maximum surface of the wind blades is desired to generate a rotational speed close to the optimum for driving the generator, while at higher wind speeds increased pitching is needed to keep the rotor speed close to the optimal speed for driving the generator.

In a further embodiment, the torsion positioning devices comprise resilient devices which are pre-stressed such that they force the gondola against a stop in a direction opposite the rotational direction of the rotor when driven by the wind. Thus a threshold torque value is created below which the gondola does not rotate about the rotational axis. The pitching of the blades due to the rotation of the gondola will only commence when the rotor rotates at a speed which is high enough to create a torque in the rotor axle which overcomes the pre-stress value of the resilient devices. This is advantageous because at low wind speeds, and thus low rotor speeds, the pitch of the blades preferably is minimal to provide an optimal blade surface for engaging the wind.

In a further preferred embodiment, a stop is provided which limits the rotation of the gondola relative to the rotor axle to a maximum. Thus a threshold value is created above which no pitching due to torsion occurs.

In a further embodiment, a stop for limiting the maximum torque is provided which allows for pitching the rotor blades by the torsion positioning devices over an angle of close to 90 degrees or even up to or over 90 degrees, such as to enable controlling the blade pitch and thus the load during normal operating conditions solely by torque. In this embodiment the centrifugal positioning devices only pitch the blades in emergency situations, in which the rotor rotates close to or at speeds which might damage the wind turbine.

In a further embodiment, no a stop for limiting the maximum torque is provided.

In a preferred embodiment, the centrifugal positioning devices comprise a centrifugal bodies in the form of two or more centrifugal arms of which one end is pivotably connected to the rotor, preferably to the rotational axle of the rotor, such that another end of the centrifugal arm is movable between the first position near the rotational axis and the second position at a distance from the rotational axis.

In this embodiment, the resilient devices of the centrifugal positioning devices force the movable end of each centrifugal arm in the position near the rotational axis, such that when the rotor is driven by the wind and the rotational speed of the rotor axle surpasses a threshold value, a centrifugal force acts on the centrifugal bodies and forces the movable end of the centrifugal arms against the resilient force from the first position towards the second position.

Each centrifugal arm is connected to the pitch adjustment devices such that when the movable ends of the centrifugal arms move from the first position to the second position, they rotate the pitch adjustment devices about the rotational axis in a direction contrary to the rotational direction of the rotor.

Providing pivotable arms as the centrifugal bodies allows for a compact, simple and reliable design.

Preferably, the electrical generator is at least partially mounted in the nacelle. The generator comprises a rotor which is driven by the rotor of the wind turbine, more in particular by the rotor axle of the wind turbine.

In one embodiment, the rotor axle is connected to the rotor of the electrical generator via gears.

In a preferred embodiment a rotor of the electrical generator is mounted on the rotor axle for cooperating with a stator of the generator which is provided in the nacelle. In this embodiment the rotor of the electrical generator is directly driven by the rotor axle of the rotor of the wind turbine, which allows for a compact wind turbine.

A wind turbine according to the first aspect of the invention is preferably of the down wind type. A wind turbine of the down wind type is provided with a rotor mounted on the lee side, i.e. down wind, of the mast or tower supporting the nacelle. Thus, the rotor can be provided with flexible rotor blades, without the risk of the blades being blown against the mast. This is an advantage both in regard to weight, and the structural dynamics of the machine, i.e., the blades will bend at high wind speeds, thus taking part of the load off the mast. A down wind wind turbine can thus be built lighter than an upwind wind turbine.

Furthermore, a wind turbine of the down wind type does not need a rudder to position its rotor blades relative to the wind flow. Thus, the surface of the down wind wind turbine, seen in a direction perpendicular to the wind flow, is limited and therefore the turbine is less susceptible to sudden, short changes in wind direction which are typical for urban areas In a further preferred embodiment, the wind turbine is of the down wind type and the mast has a first end and a second end. At the first end the mast is mountable in a holder for mounting the wind turbine, for example to a building, such that the mast is pivotable about a vertical axis. At the second end the mast supports the nacelle. The second end is located at a radial distance relative to the vertical pivot axis.

Preferably the mast is made from a flexible material such that sudden changes in wind speed are at least partially absorbed by bending of the mast. Furthermore, a flexible mast limits the transfer of vibrations from the nacelle to for example the building the wind turbine is mounted to. Preferably the wind turbine according to the first aspect of the invention is mounted on a down wind mast which in the mounted state extends in a horizontal direction as well as in a vertical direction. Such a mast is highly suited for damping horizontal and vertical vibrations generated by the rotor.

A wind turbine according to the first aspect of the invention is compact and light and therefore highly suited for mounting on buildings mounted in urban areas.

Particular embodiments of the first aspect of the invention are set forth in the dependent clauses 2-9 and independent clause 10.

Further aspects, effects and details of the first aspect of the invention are set forth in the detailed description with reference to examples of which some are shown in the schematic drawings 1-7.

According to the second aspect of the invention this object is achieved by a wind turbine according to claim clause 11. A wind turbine according to the second aspect of the present invention comprises a nacelle and a rotor, which rotor comprises a rotor axle, two or more rotor blades each having a base end and a tip end, a gondola for supporting the blades and pitch adjustment devices for pitching the blades.

The gondola is mounted on the rotor axle and is provided with a support member for each blade, the support member rotatably supporting the base end of a rotor blade such that a pivot axis of that blade extends in an essentially radial direction relative to the rotational axis of the rotor and allowing the blade to be moved about its pivot axis.

Each rotor blade is connected with a cable to the rotor axle or to a body mounted on the rotor axle. One end of the cable is connected to the blade, preferably the base end of the rotor blade, and the opposite end of the cable is connected to the rotor axle, or a body mounted thereon, for transferring at least part of the centrifugal force to which the blade is subjected during rotation of the turbine, to the rotor axle such that each blade is essentially supported by the flexible cable against movement in the radially outward direction. Preferably, during rotation of the rotor at working speed, the blade is supported against movement along its longitudinal axis, in the radially outward direction, by the cable only.

The pitch adjustment devices of the wind turbine are designed to pitch the blades about their pivot axis, while the rotor is rotated, for example for adjusting the angle of the blades relative to the direction of the wind, and doing this in relation to the rotational speed of the rotor of the wind turbine or the torque in the axis of the of the wind turbine. Many pitch adjustment systems are known in the prior art, designed for rotating blades about their pivot axis, and can be used in combination with a wind turbine according to the second aspect of the invention.

With a wind turbine according to the second aspect of the invention a blade is pivotably supported in the gondola, while the blade is supported for movement in the radial direction by the cable. Thus no roller bearings are needed for supporting the blades in the radial direction, as is typical with prior art wind turbines. With a wind turbine according to the second aspect of the invention the support members for rotatable supporting the blades in the gondola do not need to provide support in the radially outward direction, i.e. the direction radially outward relative to the rotational axis of the nacelle. Therefore, the base end of the blade can be located in roller bearing fashion in the gondola. This allows for a simplified and therefore low cost support of the blades compared to the use of roller bearings in known wind turbines.

This is furthermore advantageously since the roller bearings used for supporting the axial forces in known pitching systems are susceptible to rapid wear due to pitching the blades over small angles. Roller bearings are typically designed to operate at a certain RPM. At low RPM roller bearings do not lubricate well causing the inner parts of the roller bearings wear quickly. Thus extra maintenance attention or high end, i.e. expensive, roller bearings are needed in known pitching systems.

When the blades of a wind turbine according to the second aspect of the invention are pitched while rotating the rotor, the blade is supported in the radial direction by the cable, preferably by the cable only. The cable is with one end connected to the base end of the blade and with its opposite end to the rotor axle. When the blade is pitched, i.e. is rotated about its pivot axis, the cable supporting the blade is twisted along its longitudinal axis. A cable is an elongated flexible body with a cross section which is comparatively small compared to its length. The resistance of the cable against twisting, and thus against the pitching movement of the blade, is therefore small. Thus the cable provides a low friction support which facilitates rotating the blade about its pivot axis, in particular when the blade is supported in the radial direction by the cable only.

Furthermore, the cables thus form a simple, low cost, low maintenance support devices for supporting the blades against movement in the radially outward direction when the rotor is rotated. The cable supports thus allow for simple support members in the gondola since the gondola does not need to support the blade in the radially outward direction. In the gondola the blades are supported such that they can pivot about their pivot axis, for example by support members in the form of friction bearings supporting a stem shaped base end of the blades. The support members in the gondola can be designed less robust and less heavy than known supports since they do not need to support the blades against movement in the radially outward direction.

Preferably, the cable extends between the base end of the blade and the rotor axle in a direction essentially parallel to, and preferably essentially coincides with, the pivot axis of that blade. Thus, when the blade is rotated about its pivot axis, the cable is twisted about its longitudinal axis only. Thus the loading of the cable, and therefore the wear, due to the pitching of the blade is minimized.

In a further embodiment, the cable devices are with one end secured to the rotor axle and with their opposite end to the base end of the blade, such that when the blade is pivoted, one end of the cable is rotated relative to the opposite end of the of the cable, which cable is thus twisted.

Preferably, the blades are provided with a stop located on the radial outside of the gondola, to support the blade on the gondola against movement in the radial inward direction. The stop positions the blade in a radial direction relative to the gondola, and thus the blade is prevented from "falling" or sliding towards the rotor axle, for example when the gondola is not rotated and the blade is supported on the top side of the nacelle, i.e. the blade is in the twelve o'clock position.

Preferably the stop is located on the blade such that when the blade is supported by the stop against movement in the radially inward direction, at least the main part of the cable is extended along a straight axis. In a further preferred embodiment, the cable is extended along a straight axis and is under tension when the blade is supported by the stop. Due to the tension in the cable, the cable essentially pulls the blade inward and the stop against the outside surface of the gondola. Preferably the tension in the cables is high enough to keep the blades pulled with their respective stops against the gondola when the rotor is in rest or even when the rotor is rotated at low rotational speed and the torque in the axle is below rated torque. Thus, the pre stressed cables prevent the blades from movement in the radially outward direction when the rotor is rotated at low rotational speed and torque delivered by the rotor is below rated torque.

When the rotor is rotated, the blades are subjected to centrifugal forces which force the blades in a radially outward direction relative to the rotor axle. Thus, the tension in the cable rises when the rotational speed of the rotor rises, and the cable ultimately elongates.

In a further preferred embodiment, the material and the dimensions of the cable are such that when the wind turbine is rotating at working speeds, the centrifugal forces acting upon the cables are high enough to elongate the cable and move the blade in a radially outward direction to let the stop come free form the gondola. Thus the blades can be pivoted without contact between the gondola and the stop causing friction. Preferably movement of the blade in the radial direction over a distance of 1 mm is sufficient to allow for pivoting the blade without the stop contacting the gondola.

In a further embodiment, the cables are resiliently supported at the rotor blade and/or at the rotor axle, such that when the wind turbine is at rest the cable pulls the stop of the blade against the gondola, and when the wind turbine is rotated at working speed, the resilient support is transformed such that the blade moves in the radially outward direction and the stop comes free form the gondola.

For example, flexible bodies are provided which connect the cables to the rotor axle, such as a flexible ring mounted on the axle or helical springs provided between the cable and the axle and/or between the cable and the blade. When the rotor is rotated and centrifugal forces are exerted by the blades upon the cables, the extension of the cables is none or only limited, and the blades are moved in radial direction by transformation, such as compression or extension, of the resilient support of the cables.

Preferably, when the rotor is operated close to or above nominal torque, the blade is supported in the radial direction by the cable only. Thus, when rotating the blade about its pivot axis there is no friction between stop and gondola. The reduced friction allows for a simpler and lighter pivoting system.

Preferably, the gondola is an annular body, preferably a circular body, which provides support for all rotor blades of the wind turbine. Thus, the blades can be mounted in a single body.

Preferably, the cables are wires, for example synthetic wires or steel wires for example single wires or multiple wires twisted into s single larger wire. Wires are light and flexible and synthetic and steel wires can support high loads.

Preferably the support member in the gondola comprises a bearing, preferably a friction bearing, for supporting the blade such that it can be pitched.

The pitch adjustment devices of a wind turbine according to the second aspect of the invention are preferably mounted on the rotor axle such that the pitch adjustment devices are rotatable about the rotational axis of the rotor. The pitch adjustment devices interact with the pivotable mounted rotor blades for rotating the blades about their pivot axis to adjust their pitch. Preferably, the pitch of the rotor blades is adjusted by rotating the pitch adjustment devices and the gondola relative to each other about the rotational axis of the rotor.

In a preferred embodiment, the pitch adjustment devices comprise at least one gear rack extending in a circumferential direction about the rotational axis of the rotor, and the rotor blades each comprise a bevelled gear for cooperation with the at least one gear rack. When the gondola is rotated about the rotational axis relative to the pitch adjustment devices, the bevelled gear runs along the gear rack and the pitch of the rotor blade is adjusted. The combination of a gear rack and bevelled gear allows for compact pitch adjustment devices and in addition enable pitching over a great angle.

In a further preferred embodiment, the pitch adjustment devices, for example in the form of a gear rack, are mounted coaxially with and pivotably on the rotor axle such that the pitch adjustment devices are rotatable about the rotational axis of the rotor and relative to the gondola. The pitch adjustment devices are connected with the blades, for example bevelled gears provided on the base end of the blades, which blades are supported in the gondola such that when pitch adjustment devices are rotated relative to the rotor axle and thus relative to the gondola about the rotational axis of the rotor, the pitch of the blades is adjusted.

In a further preferred embodiment, the wind turbine comprises centrifugal positioning devices for rotating the pitch adjustment devices about the rotor axis. The position of the pitch adjustment devices relative to the rotational axis of the rotor is thus controlled by the centrifugal positioning devices.

In this embodiment, the centrifugal positioning devices preferably comprise at least two centrifugal bodies and resilient devices. The two or more centrifugal bodies are each movably connected to the rotor, preferably to the rotor axle, for movement between a first position near the rotational axis of the rotor and a second position at a distance from the rotational axis of the rotor. The resilient devices force the centrifugal bodies in the position near the rotational axis, such that when the rotor is driven by the wind and the rotational speed of the rotor axle surpasses a threshold value, a centrifugal force acts on the centrifugal bodies which forces the centrifugal bodies against the resilient force and from their first position towards their second position. The centrifugal bodies are evenly distributed about the rotational axis, such that they do not influence the stability of the rotor when the rotor is driven by the wind.

The two or more centrifugal bodies are connected to the pitch adjustment devices such that when the centrifugal bodies move from their first position to their second position, they rotate the pitch adjustment devices about the rotational axis in a direction contrary to the rotational direction of the rotor. The centrifugal bodies for example comprise one or more pivotably mounted arms, or bodies which are supported via a cam in a camshaft or on a support axle extending in the radial direction. Preferably, the centrifugal bodies are each connected to the pitch adjustment devices via a cam and camshaft connection which transfer the radial movement of the centrifugal bodies in a rotational movement of the pitch adjustment devices.

In a preferred embodiment, the centrifugal positioning devices comprise a centrifugal bodies in the form of two or more centrifugal arms of which one end is pivotably connected to the rotor, preferably to the rotational axle of the rotor, such that another end of the centrifugal arm is movable between the first position near the rotational axis and the second position at a distance from the rotational axis.

In this embodiment, the resilient devices of the centrifugal positioning devices force the movable end of each centrifugal arm in the position near the rotational axis, such that when the rotor is driven by the wind and the rotational speed of the rotor axle surpasses a threshold value, a centrifugal force acts on the centrifugal bodies and forces the movable end of the centrifugal arms against the resilient force from the first position towards the second position.

Each centrifugal arm is connected to the pitch adjustment devices such that when the movable ends of the centrifugal arms move from the first position to the second position, they rotate the pitch adjustment devices about the rotational axis in a direction contrary to the rotational direction of the rotor.

Providing pivotable arms as the centrifugal bodies allows for a compact, simple and reliable design.

In a preferred embodiment, the blades of the wind turbine are supported in an outer part of the gondola and connected via the cables to an inner part of the gondola. For example, the gondola may be wheel shaped, comprising an inner ring or hub and an outer ring. Such a gondola thus comprises two concentric rings which are connected to each other via for example spokes. The outer ring is provided with supports preferably in the form of openings for receiving the bottom end of the blades, and for supporting the blades parallel to the rotor axle. The blades are connected to the inner ring or hub via cables, and are thus supported in the radially outward direction. The blades are thus supported in a single, rigid body, the gondola, which is mounted on the rotor axle. This allows for a simple and robust construction and facilitates construction of the rotor.

In a further embodiment, the gondola is mounted coaxially and pivotably on the rotor axle such that the gondola is pivotable about the rotational axis of the rotor and relative to the pitch adjustment devices. In addition, the pitch adjustment devices are mounted on the rotor axle and are connected with the blades supported in the gondola such that when the gondola is rotated relative to the rotor axle and thus relative to the pitch adjustment devices about the rotational axis of the rotor, the pitch of the blades is adjusted. Thus a simple and efficient system for pitching the blades is provided.

Preferably, the gondola is mounted coaxially and pivotably on the rotor axle and the rotor comprises torsion positioning devices, which connect the gondola to the rotor axle. The position of the gondola relative to the rotational axis of the rotor is controlled by the torsion positioning devices. The torsion positioning devices of the rotor connect the gondola to the rotor axle such that when the rotor is driven by the wind and a torque is generated in the rotor axle, and which is transferred via the torsion devices from the gondola to the rotor axle, the gondola rotates about the rotational axis of the rotor and relative to the pitch adjustment devices in the rotational direction of the rotor.

In a further embodiment, the gondola has a central opening in which it receives the rotor axle. The torsion positioning devices furthermore comprise resilient devices, for example a rubber ring, which are mounted in between the rotor axle and the gondola to connect the gondola to the axle. This allows for a secure and stable support of the gondola by the rotor axle. Furthermore, by connecting the gondola via flexible devices to the rotor axle, vibrations in the gondola due to its rotation are dampened.

In a preferred embodiment, the torsion positioning devices comprise resilient devices which have a stiffness which decrease when the torque acting on the resilient devices increases, i.e. digressive resilient. Such torsion positioning devices allow for minimal movement of the gondola relative to the pitch adjustment devices, and thus minimal pitching, of the blades at low wind speed, and increased movement of the gondola relative to the pitch adjustment devices, and thus increased pitching, at higher wind speeds. This is advantageous since at low wind speeds the maximum surface of the wind blades is desired to generate a rotational speed close to the optimum for driving the generator, while at higher wind speeds increased pitching is needed to keep the rotor speed close to the optimal speed for driving the generator.

In a further embodiment, the torsion positioning devices comprise resilient devices which are pre-stressed such that they force the gondola against a stop in a direction opposite the rotational direction of the rotor when driven by the wind. Thus a threshold torque value is created below which the gondola does not rotate about the rotational axis. The pitching of the blades due to the rotation of the gondola will only commence when the rotor rotates at a speed which is high enough to create a torque in the rotor axle which overcomes the pre-stress value of the resilient devices. This is advantageous because at low wind speeds, in which case low rotor speeds, the pitch of the blades preferably is minimal to provide an optimal blade surface for engaging the wind.

In a further preferred embodiment, a stop is provided which limits the rotation of the gondola relative to the rotor axle to a maximum. Thus a threshold value is created above which no pitching due to torsion occurs.

In a further embodiment, a stop for limiting the maximum torque is provided which allows for pitching the rotor blades by the torsion positioning devices over an angle of 0-90, such as to enable controlling the blade pitch and thus the load during normal operating conditions solely by torque. In this embodiment the centrifugal positioning devices only pitch the blades in emergency situations, in which the rotor rotates close to or at speeds which might damage the wind turbine.

In a further embodiment, no stop for limiting the maximum torque is provided.

In a further embodiment according to the second aspect of the invention, the wind turbine comprises pitch adjustment devices mounted coaxially with and pivotably on the rotor axle such that the pitch adjustment devices are rotatable about the rotational axis of the rotor and relative to the gondola, and a gondola mounted coaxially and pivotably on the rotor axle such that the gondola is pivotable about the rotational axis of the rotor and relative to the pitch adjustment devices.

In such an embodiment, preferably, the torsion positioning devices regulate the pitch of the blades at a low rotational speed and the centrifugal positioning devices regulate the pitch of the blades at a higher rotational speed. When the speed of the rotor is zero, the rotor blades are positioned in what is called their initial position. When a rotor blade is pitched, it is pivoted about its longitudinal axis over an angle such that the blade in the pitched position is at an angle relative to the same blade when in its initial position. Preferably the maximum pitch positions the blades at an angle of about 90 degrees with the initial position of the blades, such that the faces of the blades are positioned parallel to the wind flow. In this position the blades are feathered, i.e. positioned to minimize their lift capacity and generate minimal or none rotational power. The blades are pitched in this position to prevent heavy winds from overloading the wind turbine.

In a preferred embodiment according to the second aspect of the invention, the torsion positioning devices enable a pitch adjustment of the rotor blades over a first angle, preferably over an angle of 0-30 degrees relative to the blade in its initial position, and the centrifugal positioning devices enable a pitch adjustment of the rotor blades over a second angle, preferably over an angle of 30-90 degrees relative to the blade in its initial position.

Because a wind turbine according to the second aspect of the invention enables the rotor blades to be pitched, the maximum torque provided by the rotor can be limited. A low maximum torque allows for a small and light electrical generator. This in turn allows for a small and light nacelle. Furthermore, a small generator has a low cut in speed and thus the turbine is able to deliver electrical energy at low wind speeds.

In a further embodiment, the torsion positioning devices control the load during normal operating conditions, while the centrifugal positioning system only takes control when the rotational speed comes close to a speed which might damage the wind turbine, for example due to sudden gust of heavy side winds or extreme wind speeds. In this embodiment the torsion positioning devices are able to pitch the blades over an angle of 0 up to about 90 degrees or close thereto, relative to the blade in its initial position. When the blades are pitched over the full angle, they are positioned in the so called feather position.

With such a wind turbine, the pitch adjustment devices allow for adjusting the pitch of the rotor blades via centrifugal positioning devices, which are linked to the rotational speed of the rotor, and via torsional positioning devices, which are linked to the torque transferred from the rotor tot the generator.

The pitch adjustment devices enable a small wind load during storms and also provide an overload protection. Thus, the pitch adjustment devices enable the use of a small and light generator, which in turn enables a low cut in speed and a compact and light nacelle. This, in combination with the small wind load during storms, further enables a light and flexible mast that prevents transmission of vibrations from the rotor to the foundation of the mast and attached (building) structures.

By linking both the centrifugal positioning devices and the torsion positioning devices via the pitch adjustment devices to each rotor blades, instead of coupling both positioning devices via separate pitch adjustment devices to each rotor blade, the second aspect of the invention provides a compact, light and cost efficient system for adjusting the pitch of the rotor blades, and thus a compact, light and cost efficient wind turbine.

Furthermore, the pitch adjustment devices, the gondola and the blades are designed such that the pitch adjustment devices pitch all the blades simultaneously and over the same angle. Thus, the wind load on the rotor remains balanced.

The wind turbine comprises a nacelle and a rotor which is pivotably mounted in the nacelle such that the rotor can be driven by the wind in a rotational direction about a rotational axis of the wind turbine rotor.

Preferably, an electrical generator for generating electrical energy is provided in the nacelle. The rotor axle, for driving the generator, is pivotably supported in the nacelle and the rotor is preferably pivotably supported in the nacelle by the rotor axle. The rotor axle coincides with the rotational axis of the rotor, i.e. the rotor axle has a central longitudinal axis about which it rotates in mounted condition, and which coincides with the rotational axis of the rotor. During use, the rotational axis of the rotor is essentially parallel to the wind flow.

Preferably, the electrical generator is at least partially mounted in the nacelle. The generator comprises a rotor which is driven by the rotor of the wind turbine, more in particular by the rotor axle of the wind turbine.

In one embodiment, the rotor axle is connected to the rotor of the electrical generator via gears.

In a preferred embodiment a rotor of the electrical generator is mounted on the rotor axle for cooperating with a stator of the generator which is provided in the nacelle. In this embodiment the rotor of the electrical generator is directly driven by the rotor axle of the rotor of the wind turbine, which allows for a compact wind turbine.

The gondola of the wind turbine is coaxially and pivotably connected to the rotor axle, such that the gondola is pivotable about the rotational axis of the rotor. The gondola supports two or more rotor blades such that they extend in a radial direction relative to the rotational axis of the rotor. The rotor blades are pivotably mounted in the gondola such that the pitch of the rotor blades is adjustable. To alter the pitch of a rotor blade, the blade is pivoted about its longitudinal axis which preferably coincides with the pivot axis of the blade. Adjusting the pitch of a blade, i.e. its orientation relative to the wind flow, alters the aerodynamics and the efficiency of the blade, and thus allows for controlling the speed of the rotor and the transformation of wind energy into mechanical energy. The pivotably mounted rotor blades cooperate with the pitch adjustment devices of the rotor which control the pitch of the blades.

A wind turbine according to the second aspect of the invention is preferably of the down wind type. A wind turbine of the down wind type is provided with a rotor mounted on the lee side, i.e. down wind, of a mast or tower supporting the nacelle. Thus, the rotor can be provided with flexible rotor blades, without the risk of the blades being blown against the mast. This provides an advantage both in regard to weight and the structural dynamics of the machine. A down wind wind turbine can thus be built lighter than an upwind wind turbine.

Furthermore, a wind turbine of the down wind type does not need a rudder to position its rotor blades relative to the wind flow. Thus, the surface of the down wind wind turbine, seen in a direction perpendicular to the wind flow, is limited and therefore the turbine is less susceptible to sudden, short changes in wind direction which are typical for urban areas In a further preferred embodiment, the wind turbine is of the down wind type and the mast has a first end and a second end. At the first end the mast is mountable in a holder for mounting the wind turbine, for example to a building, such that the mast is pivotable about a vertical axis. At the second end the mast supports the nacelle. The second end is located at a radial distance relative to the vertical pivot axis.

Preferably the mast of the wind turbine is made from a flexible material such that sudden changes in wind speed are at least partially absorbed by bending of the mast. Furthermore, a flexible mast limits the transfer of vibrations from the nacelle to for example the building the wind turbine is mounted to. Preferably the wind turbine according to the second aspect of the invention is mounted on a down wind mast which in the mounted state extends in a horizontal direction as well as in a vertical direction. Such a mast is highly suited for damping horizontal and vertical vibrations generated by the rotor.

A wind turbine according to the second aspect of the invention is compact and light and therefore highly suited for mounting on buildings mounted in urban areas.

Particular embodiments of the second aspect of the invention are set forth in the dependent clauses 12-29 and independent clause 30. Further aspects, effects and details of the second aspect of the invention are set forth in the detailed description with reference to examples of which some are shown in the schematic drawings 8-13.

BRIEF DESCRIPTION OF THE DRAWINGS

In the drawings:

FIG. 7A shows a view of the gondola on the rotor axle in an unloaded position;

FIG. 7B shows a view of the gondola of FIG. 7A on the rotor axle in a loaded position;

FIG. 11 shows an enlarged view of the centrifugal positioning devices of the wind turbine of FIG. 8 with the centrifugal bodies in a first position;

FIG. 12 shows an enlarged view of the centrifugal positioning devices of the wind turbine of FIG. 8 with the centrifugal bodies in a second position.

DETAILED DESCRIPTION OF THE INVENTION

Figure 1:
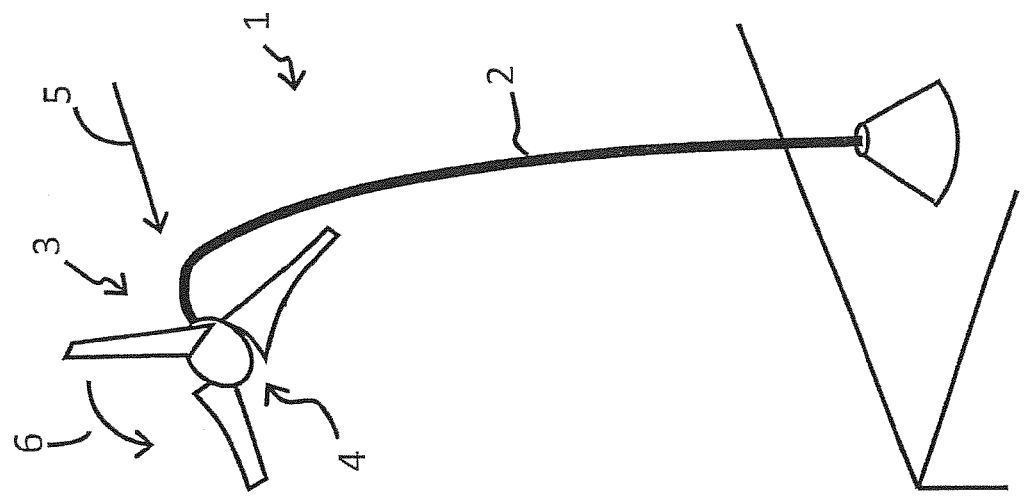
FIG. 1 shows a perspective view of a wind turbine according to the first aspect of the invention.

FIG. 1 shows an embodiment of a wind turbine 1 according to the first aspect of the invention. The wind turbine 1 comprises a mast 2 which pivotably supports a nacelle 3, and a rotor 4 which is pivotably mounted in the nacelle such that it can be driven by the wind in a rotational direction indicated with arrow 6.

The wind turbine is of the down wind type. In the embodiment shown, the mast is, at a first end, pivotably mounted in a holder which is located on the flat roof of a building. The holder supports the mast such that it is pivotable about a vertical axis. In an alternative embodiment, the mast is for example mounted to a wall or the turbine is supported by a free standing mast or structure instead of on a building.

At a second end the mast supports the nacelle. The second end is located at a radial distance relative to the vertical pivot axis of the mast in the holder. Thus, when the wind turbine, more in particular the nacelle, is subjected to a wind flow, the mast pivots until the nacelle is positioned in a down wind position relative to the vertical pivot axis of the mast. In this down wind position, the rotor of the wind turbine is positioned to engage the wind flow.

Preferably the mast is made from a flexible material such that sudden changes in wind speed are at least partially absorbed by bending of the mast. Furthermore, a flexible mast limits the transfer of vibrations from the nacelle to for example the building the wind turbine is mounted to.

The rotor of the particular embodiment shown is provided with three rotor blades 8. Via the blades, the rotor is driven by a wind flow, indicated with arrow 5, such that the rotor is driven in a rotational direction, indicated with arrow 6, about a rotor rotational axis of the rotor, indicated with line 7 in FIG. 2.

Figure 2:
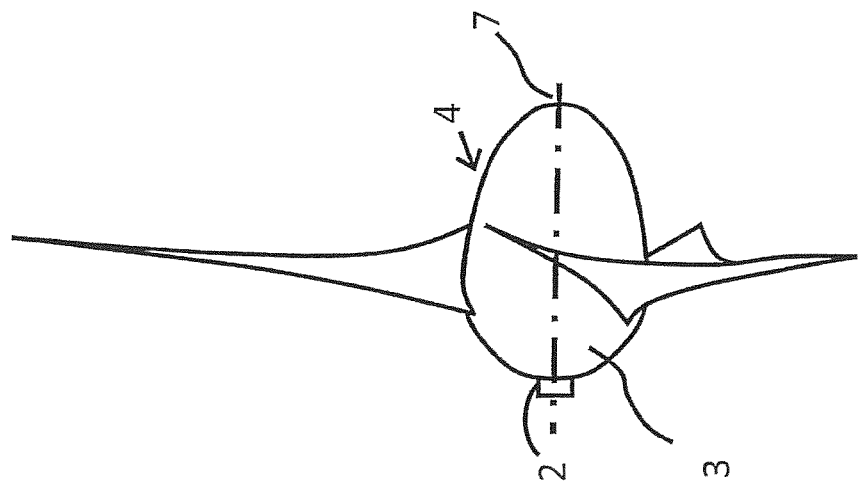
FIG. 2 shows a side view of the nacelle and rotor of the wind turbine of FIG. 1.
Figure 3:
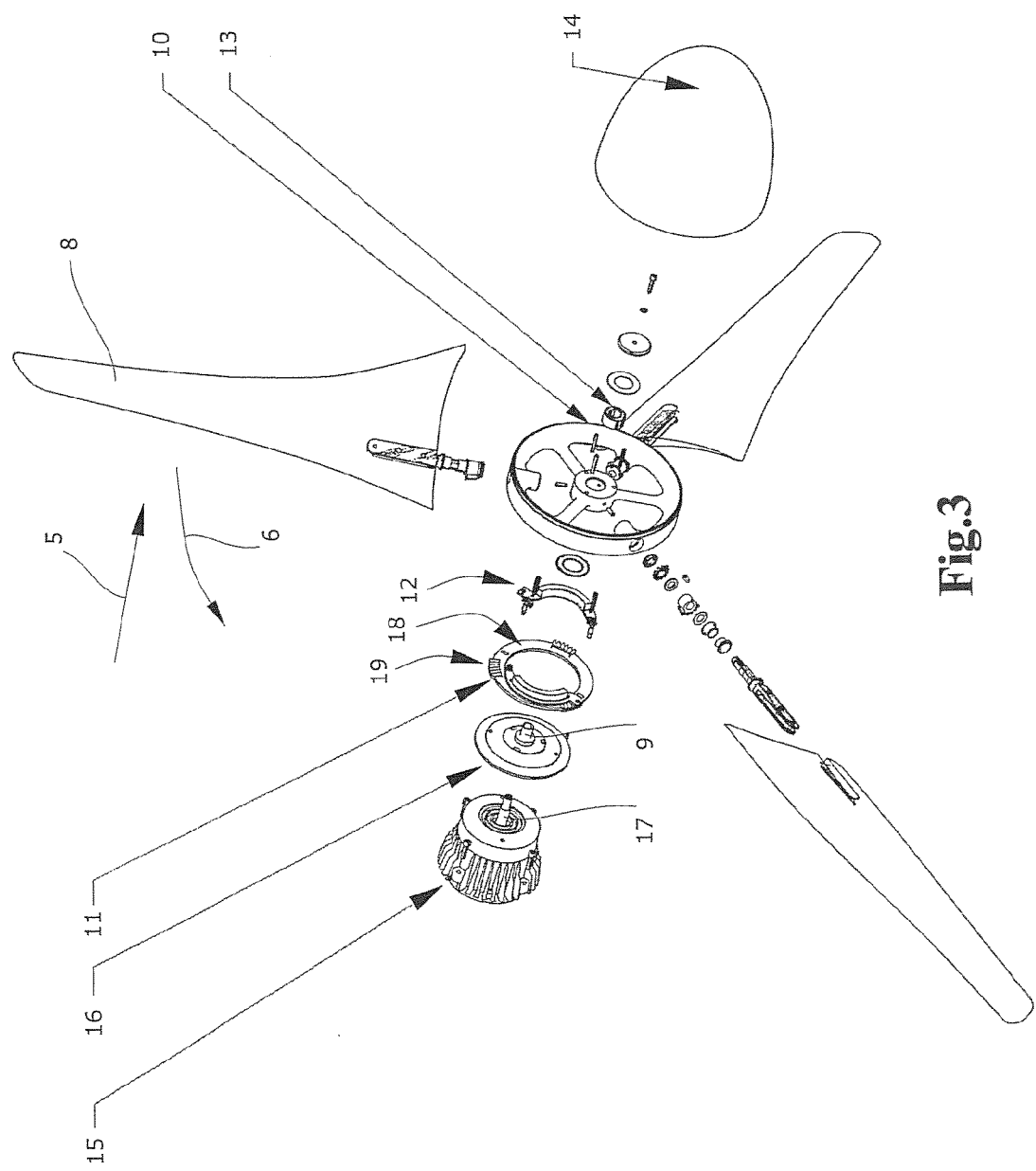
FIG. 3 shows an exploded view of the rotor of the wind turbine of FIG. 1.

FIG. 3 shows an exploded view of the rotor of the wind turbine shown in FIGS. 1 and 2. The exploded view shows the main parts of the rotor 4, i.e. a rotor axle 9, gondola 10, pitch adjustment devices 11, centrifugal positioning devices 12 and torsion positioning devices 13. Under normal operating conditions these parts are enclosed in a cone shaped housing part 14 and the nacelle.

The rotor axle 9 of the rotor 4 coincides with the rotational axis of the rotor 7, i.e. the rotor axle has a central longitudinal axis about which it rotates in mounted condition, and which coincides with the rotational axis of the rotor. During use, the rotational axis of the rotor is positioned essentially parallel to the wind flow.

The wind turbine further comprises an electrical generator 15 for generating electrical energy. The electrical generator comprises a stator and a rotor, which are not shown in the exploded view. In the embodiment shown, the rotor is provided with a mounting disc 16 which amongst others supports the pitch adjustment devices. In a preferred embodiment the stator of the electrical generator is mounted in the nacelle, and the rotor of the electrical generator is mounted on the rotor axle 9 of the wind turbine. In such an embodiment the rotor preferably replaces the mounting disc 16 as a support device. For example the pitch adjustment devices can then be mounted to the rotor. Thus the overall number of components and the weight of the wind turbine are reduced.

The rotor axle 9 of the wind turbine shown is pivotably supported in the nacelle. In the particular embodiment shown, the rotor axle 9 is hollow. The hollow rotor axle is mounted over a supporting axle 17 extending form the generator 15, and connected to the rotor part of the generator, which generator is stationary mounted in the nacelle 3. Thus, the rotor 4 of the wind turbine is pivotably supported in the nacelle 3 by the rotor axle 9 and directly drives the electrical generator, more in particular the rotor part of the electrical generator.

The gondola 10 of the wind turbine 1 is coaxially and pivotably connected to the rotor axle 9. The gondola 10 supports three rotor blades such that they extend in an essential radial direction relative to the rotational axis of the rotor. The gondola is pivotably connected because it is rotatable about the rotor axle. The gondola is coaxially connected because it is rotatable about its centre axis, i.e. the axis which is located central to the three rotor blades mounted in the gondola. Thus, the gondola is pivotable about the rotational axis 7 of the turbine rotor 7, and thus able to move the blades about the rotational axis, relative to the rotor axle.

In the embodiment shown the gondola is a ring shaped body. The gondola functions also as a frame to which for example the cone 14 is mounted. In alternative embodiment the gondola body is for example rectangular shaped or star shaped frame part which is preferably partially or entirely enclosed within a housing such as for example the cone shaped part 14.

The rotor blades 8 are pivotably mounted in the gondola 10 such that the pitch of the rotor blades is adjustable. To alter the pitch of a rotor blade, the blade is pivoted about its longitudinal axis. Adjusting the pitch of a blade, i.e. the orientation of the blade, alters the aerodynamics and the efficiency of the blade. Pitching the blade thus influences the efficiency at which wind energy is transformed into mechanical energy.

In the particular embodiment shown, the pitch adjustment devices comprise a ring shaped body 18 provided with three gear racks 19, one for each rotor blade. The gear racks extending in a circumferential direction about the rotational axis of the rotor. In an alternative embodiment, instead of a ring shaped body the pitch adjustment devices comprise for example a rectangular or star shaped frame for supporting the pitch adjustment devices which interact with the rotor blades.

The rotor blades each comprise a bevelled gear 20 for cooperation with a gear rack 19. In the assembled state of the rotor, the bevelled gears engage the gear racks of the pitch adjustment devices. Thus, when the gondola is rotated about the rotational axis relative to the pitch adjustment devices, the bevelled gear runs along the gear rack and the pitch of the rotor blade is adjusted. The combination of a gear rack with a bevelled gear allows for compact pitch adjustment devices which enables pitching over a great angle, for example over a 90 degree angle. It is noted that in the embodiment shown the combinations of gear racks and gears are located at similar radial distances to the rotational axis of the gondola. Alternative embodiments are possible wherein for example the gear racks and bevelled gears are for each blade located at a different distance.

With a wind turbine according to the first aspect of the invention, the pitch of the rotor blades is adjusted by rotating the pitch adjustment devices and the gondola relative to each other about the rotational axis of the rotor. The gondola and the pitch adjustment devices are rotated relative to each other by the torsion positioning devices and the centrifugal positioning devices. Both interact with the blades via the pitch adjustment devices, which allows for a compact design of the rotor.

To allow for pitching of the blades, the pitch adjustment devices of a wind turbine according to the first aspect of the invention are mounted coaxially and pivotably on the rotor axis such that the pitch adjustment devices are rotatable about the rotational axis of the rotor and relative to the gondola and the rotor axle.

Figure 4:
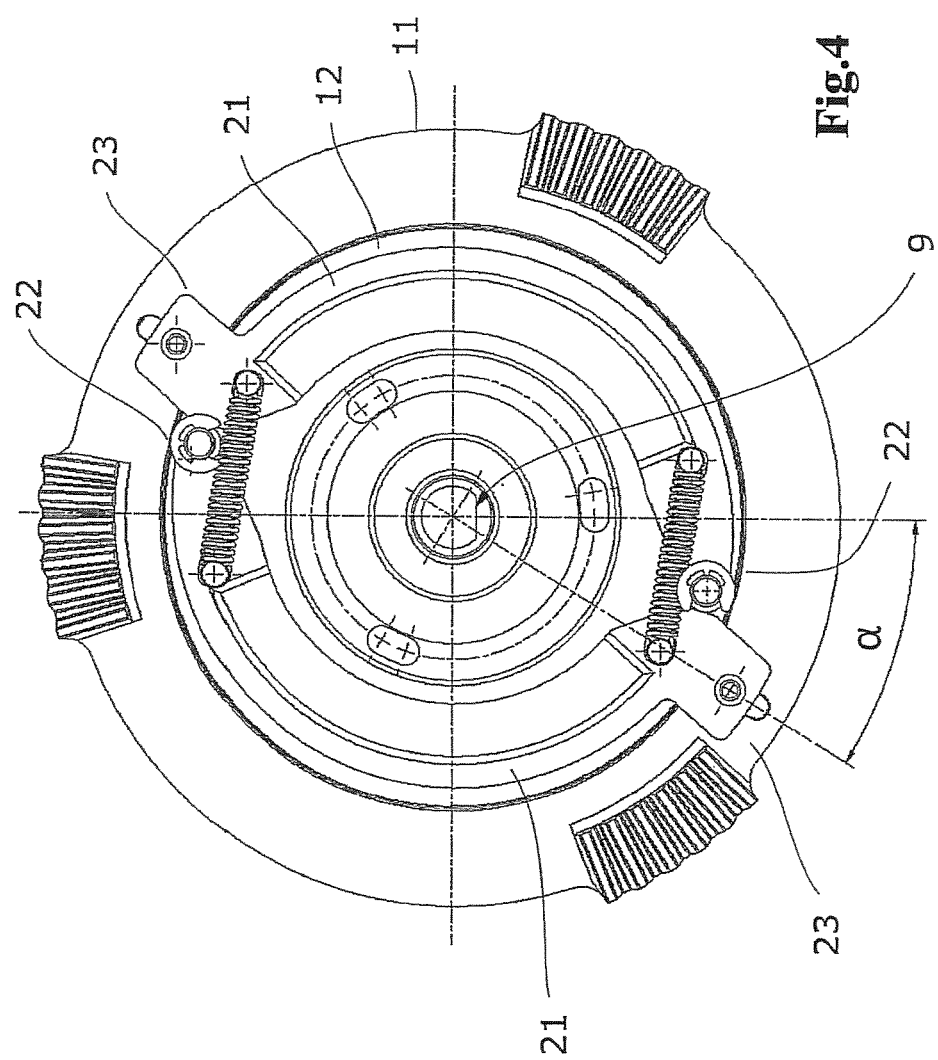
FIG. 4 shows an enlarged view of the centrifugal positioning devices of the wind turbine of FIG. 1 with the centrifugal bodies in a first position.

FIG. 4 shows a close up of the centrifugal positioning devices 12 of the wind turbine supporting the ring shaped pitch adjustment devices 11. In the preferred embodiment shown, the centrifugal positioning devices comprise centrifugal bodies in the form two centrifugal arms 21, which are located on opposite sides of the rotor axle 9.

Both arms 21 are at one end 22 pivotably connected to the rotor of the wind turbine. In the embodiment shown the arms are pivotably connected to mounting plate 16, which is mounted on the rotor axle 9. The opposite second end 23 of each arm 21 is connected to the pitch adjustment devices via a cam/cam shaft connection.

Figure 5:
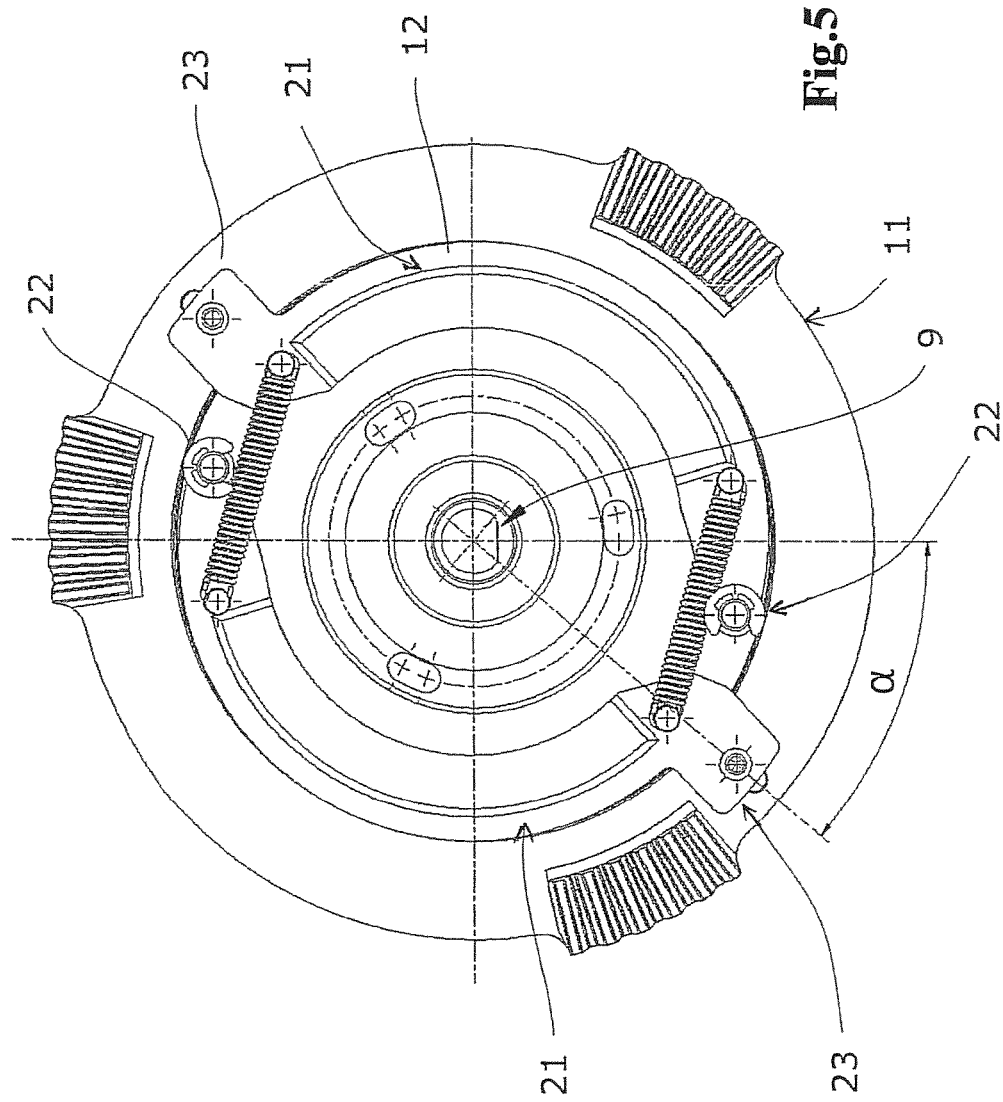
FIG. 5 shows an enlarged view of the centrifugal positioning devices of the wind turbine of FIG. 1 with the centrifugal bodies in a second position.

Since the first end 22 of each centrifugal arm is pivotably connected, the other end 23 of each arm is movable between a first position near the rotational axis and the second position at a distance from the rotational axis. FIG. 4 shows both arms in the first position. FIG. 5 shows both arms in the second position. When the pivotable arms move from the first position to the second position, the pitch adjustment devices are rotated about the rotational axis of the rotor in a direction contrary to the rotational direction of the rotor.

In the preferred embodiment shown the pitch adjustment devices are pivotably mounted on the mounting plate 16, i.e. can move about the rotational axis of the rotor, which mounting plate is mounted on the rotor axle 9. In an alternative embodiment, the pitch adjustment devices are for example pivotably supported by the centrifugal positioning devices or are pivotably mounted on the rotor axle or in the housing of the rotor. In a further alternative embodiment, the arms are provided such that they extend at an angle to the rotational axis of the rotor or in the longitudinal direction of the rotational axis of the rotor.

Resilient devices in the form of spring elements force the movable end of the centrifugal arm in the position near the rotational axis. When the rotor is driven by the wind a centrifugal force acts on the centrifugal bodies, i.e. the arms. When the rotational speed of the rotor axle surpasses a threshold value, the centrifugal force is high enough to overcome the resilient force of the spring elements, and the movable ends of the centrifugal arms move out of the first position towards, and ultimately into, the second position.

The spring devices are pre stressed, such that only when the speed of the rotor surpasses a threshold value, the arms move from the first to the second position and the pitch adjustment devices are rotated about the rotational axis relative to the gondola supporting the rotor blades. By rotating the pitch adjustment devices relative to the gondola, the tooth racks are moved along the bevelled sprockets of the rotor blades and the pitch of the rotor blades is adjusted to reduce the efficiency of the rotor and limit the increase in rotational speed of the rotor.

In the particular embodiment shown, the pitch adjustment devices are designed to pivot the blades such that the faces of the blades are positioned essentially parallel to the wind flow when the arms are in the second position. In this so called feather position, the efficiency of the rotor blades is near zero. The pitch adjustment devices in combination with the centrifugal position devices thus form an efficient device for topping off the maximum speed of the rotor.

Figure 6:
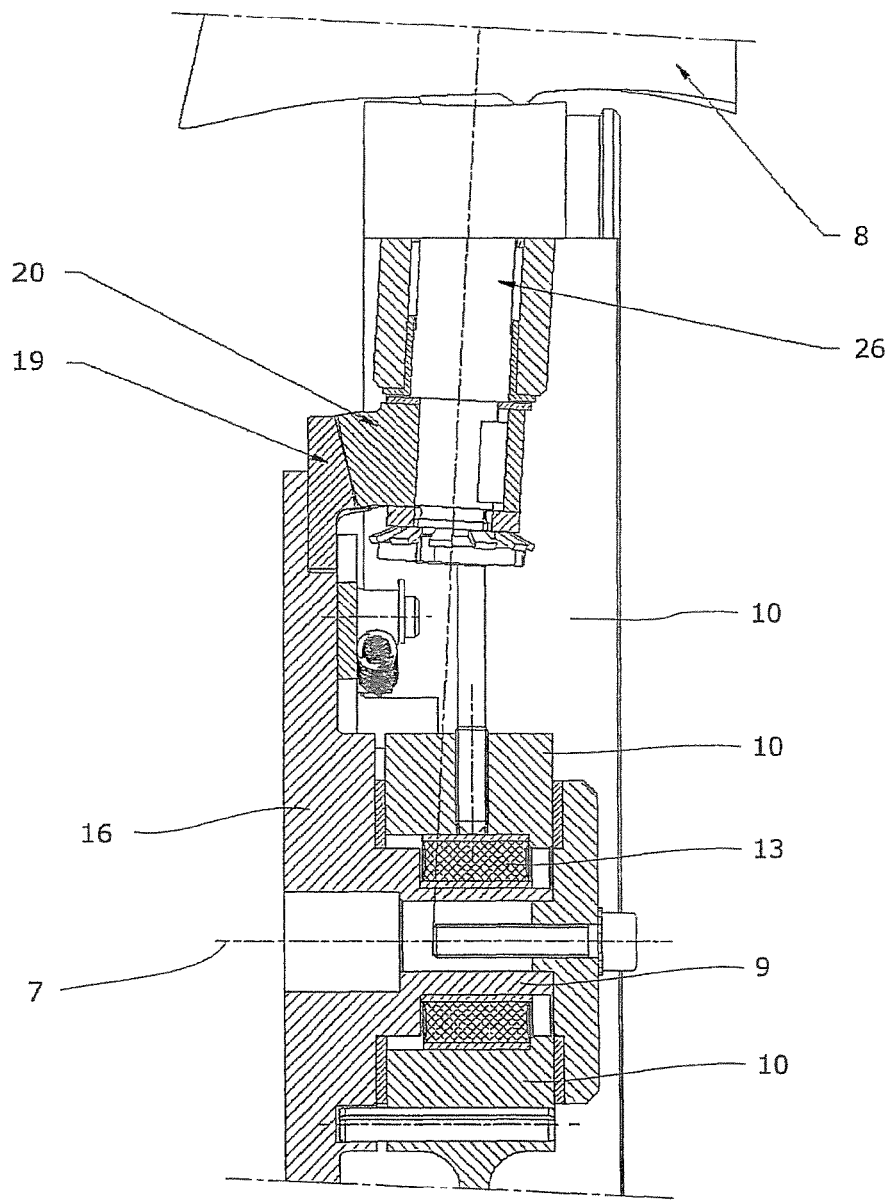
FIG. 6 shows a cross sectional side view in close up of the rotor of the wind turbine of FIG. 1.

FIG. 6 shows a side view in cross section which depicts the gondola 10 which is mounted via torsion positioning devices 13 on the rotor axle 9. The figure furthermore shows a blade 8 which has an axle 26 which is pivotably supported in the gondola 9, such that the bevelled gear 20 which is mounted on the blade axle 26 interacts with the gear rack 19 mounted on the mounting disc 16.

The position of the gondola 10 relative to the rotational axis of the rotor is controlled by the torsion positioning devices. In the preferred embodiment shown, the gondola 10 has a central opening in which it receives the rotor axle 9. The torsion positioning devices shown comprise resilient devices in the form of a rubber ring or cylinder 13. The rubber cylinder 13 is mounted on the section of the rotor axle 9 received in the opening of the gondola 10. The gondola is in turn mounted on the rubber cylinder. The torsion positioning devices of the rotor thus connect the gondola 10 to the rotor axle 9.

During use, the rotor drives the generator. Thus, the rotor axle, which at one end is driven by the rotor and at its opposite end drives the electrical generator, is subjected to a torque. Due to the torque, the torsion devices are stretched and the gondola rotates in the rotational direction of the rotor about the rotational axis of the rotor and relative to the pitch adjustment devices and the rotor axle. When the wind speed increases more electrical energy is generated, the torque in the axle increases, the gondola rotates further about the rotor axle relative to the pitch adjustment devices and the angle over which the blades are pitched increases.

FIGS. 7A and 7B show the gondola 10 mounted on the rotor axle 9 via the torsion positioning devices 13, when seen in a direction parallel to the rotor axle. FIG. 7A shows the gondola in its initial, unloaded position. FIG. 7B shows the position of the gondola 10 relative to the rotor axle 9 in a loaded condition, i.e. when the rotor is driving the generator.

In the loaded condition shown in FIG. 7B the gondola 10 is in the rotated position relative to the rotor axle 9, when compared to its initial position show in FIG. 7A. It is noted that in both figures the rotor axle 9, shown in cross section, is depicted in the same position, i.e. the rotor axle in FIG. 7B is not rotated relative to the rotor axle in 7A.

The rotated position of the gondola is indicated with a second dotted line in FIG. 7B, the first, vertical, dotted line indicating the initial position of the gondola. On the axle only one dotted line is shown since it is not moved relative to its position in FIG. 7A. The torsion positioning devices, as intermediate between the gondola and the axle, are on the inside surface fixed relative to the rotor axle, and on the outside surface fixed relative to the gondola.

As was explained above, the gondola 10 is rotated relative to the rotor axle 9 due to gondola 10 driving the rotor axle 9, and more in particular the electrical generator, via the torsion positioning devices 13. The torsion positioning devices 13, being driven by the gondola 10 at one end and driving the rotor axle 9 at its opposite end, are thus subjected to a torque. Due to the torque the torsion positioning devices 13 are stretched and the gondola 10 rotates about the rotor axle 9 in the rotational direction of the rotor. The gondola 10 is thus rotated relative to the pitch adjustment devices and the blades are pivoted about their longitudinal axis.

The extent to which the torsion positioning devices are stretched, and thus the angle over which the gondola is rotated, depends on the force with which the gondola drives the axis. When the blades of the rotor are no longer driven by the wind, the torsion positioning returns the gondola to its initial position shown in FIG. 7A.

In a preferred embodiment, the torsion positioning devices comprise non linear spring elements, such that the stretching more than linear increases with an increment of the torque to which the spring element is subjected. Thus the rotation of the gondola relative to the rotor axle is less at low wind speeds and increases with higher wind speeds. Such torsion positioning devices provide minimal pitching of the blades at low wind speed and increased pitching when at higher wind speeds.

In an alternative embodiment, the linear resilient devices are combined with pitch adjustment devices, preferably the rack and sprockets, which are shaped such that the pitch progressively increases with the wind speed. Thus a reduced pitching effect at low wind speeds and an increased pitching effect at high wind speeds can be achieved with simple linear spring devices.

Preferably, the rotor is provided with a stop which blocks rotation of the gondola due to the torsion positioning devices in a direction contrary to the rotational direction of the rotor. Preferably, the torsion positioning devices comprise resilient devices which are pre stressed such that they force the gondola against the stop. Thus a threshold value is created and a minimum torque is required to enable rotation of the gondola relative to the pitch adjustment devices by the torsion positioning devices.

Furthermore, preferably a stop is provided which limits rotation of the gondola due to the torsion positioning devices in the rotational direction of the rotor to a maximum.

In a further embodiment, no stop for limiting the maximum torque is provided, such as to enable controlling the blade pitch and thus the load during normal operating conditions solely by torque and thus the torsion positioning devices. During emergency situations, when the rotor rotates at too high a rotational speed, the centrifugal positioning devices, in addition to the torsion positioning devices, control the blade pitch.

The torsion positioning devices regulate the pitch of the blades at a low rotational speed and the centrifugal positioning devices regulate the pitch of the blades at a high rotational speed. When the speed of the rotor is zero, the rotor blades are positioned in what is called there initial position. When a rotor blade is pitched, it is pivoted about its longitudinal axis over an angle such that the blade in the pitched position is at an angle relative to the same blade when in its initial position.

In a preferred embodiment according to the first aspect of the invention, the torsion positioning devices enable a pitch adjustment of the rotor blades over a first angle, preferably over an angle of 0-30 degrees relative to the blade in its initial position, and the centrifugal positioning devices enable a further pitch adjustment of the rotor blades over a second angle, preferably over an angle of 30-90 degrees relative to the blade in its initial position.

In a further preferred embodiment, the torsion positioning devices comprise pre-stressed resilient devices, such that the rotor has three pitching zones.

In the first pitching zone the rotor rotates at low wind speeds, for example 0 to 9 m/s. In this zone the rotor blades are not pitched and remain in their initial position. In the second pitching zone the rotor rotates at optimal, or nominal, speed for driving the electrical generator, for example at wind speeds of 9 to 22 m/s. In this zone the pitch of the rotor blades is controlled by the torsion positioning devices. In the third pitching zone, for example at wind speeds higher than 22 m/s, the rotor speed is topped off to prevent damage to the rotor and/or electrical generator. In this zone the pitch is controlled by the centrifugal positioning devices which are preferably able to pitch the blades in a position in which the sides of the blades are positioned parallel to the wind flow.

The first pitching zone preferably stretches from the rotor starting to pick up speed, up to the rotor rotating at a speed preferably optimal for driving the generator. In this first zone, the speed of the rotor increases when the wind speed increases. Furthermore, the power generated by the electrical generator, which is driven by the rotor, increases when the rotor speed increases. Thus, the speed increase of the rotor in the first zone leads to an increase in power generated by the electrical generator, which leads to an increase in the torque in the rotor axle driving the generator.

The torsion devices controlling the position of the gondola are pre stressed. Therefore only when the rotational speed reaches a threshold value, the torque transferred from the gondola to the rotor axle is high enough to stretch the torsion devices. Due to the stretching, i.e. torsion, of the torsion devices, the gondola pivots relative to the pitch adjustment devices, which causes the blades to pitch. This is the starting point of the second pitching zone. In this zone, an increased loading of the generator will operate through the torsion positioning devices to pivot the blades of the rotor to reduce the speed thereof.

Due to the pitching of the blades, the efficiency of the rotor in picking up wind energy is decreased, and the increase of rotational speed is reduced. Preferably the rotor blades are pitched such that an increase in wind speed leads to none or only a little increase of rotational speed of the rotor. Thus an increase in wind speed only leads to a comparatively small increase in rotor speed, and thus allows for driving generator at, or close to, its optimal speed over a wide range in wind speeds. Preferably, the torsion positioning devices are designed to pitch the blades over an angle of 0 to 30 degrees relative to the initial position of the blades in the first pitching zone.

When the wind speed even further increases, the rotational speed of the rotor, more in particular of the rotor axle, reaches a second threshold value and the rotor enters the third pitching zone. In this zone, the centrifugal force acting on the centrifugal bodies is high enough to overcome the resilient force with which the centrifugal bodies are pressed into their firs opposition near to the rotational axis. The centrifugal force thus forces the centrifugal bodies in a radial direction away from the rotational axis. The centrifugal bodies are coupled to the pitch adjustment devices such that their movement in the radial direction rotates the pitch adjustment devices about the rotational axis and relative to the gondola and the rotor axle. Thus the blades are further pitched. When the rotor speed is high enough, the centrifugal bodies are moved into their second position. When the centrifugal bodies are in the second position the pitch adjustment devices are positioned such that the pitch of the blades is at maximum, preferably at an angle of 90 degrees compared to the position of the blades when in the first pitching zone.

The pitching zones are defined by the pitching of the blades and the devices which control the pitching. Preferably, the different pitching zones do not overlap. However, it is noted that when for example digressive resilient devices are used as torsion positioning devices, and which are not pre-stressed, minimal pitching may already occur at low wind speeds even though pitching which significantly influences the speed of the rotor will only occur at higher rotational speeds. It is the significant pitching which is relevant for defining the pitching zones.

When linear spring devices are used which are not pre-stressed, the rotor has two speed zones instead of three. The first pitching zone stretches from the rotor starting to pick up speed, up to the rotor rotating close to its maximum speed. This zone thus covers the first two zones of the above example.

In the first speed zone the pitching of the blades starts when the rotor picks up speed, and increases when the wind speed increases. When the speed of the rotor reaches a threshold value, which is preferably close to the maximum advisable speed of the rotor, the centrifugal adjustment devices start pitching the blades. The centrifugal adjustment devices ultimately pivot the blades in their feather position to prevent damage to the turbine by high wind speeds.

In a further embodiment, the torsion positioning devices control the pitching of the blades up to and into their feather position, such as to enable controlling the blade pitch and thus the load solely by torque under normal operating conditions. In emergency situations, in which the rotational speed of the rotor gets too high and the wind turbine might get damaged, the centrifugal positioning devices further control the pitching of the blades. This control thus consists of two zones. A single normal operating zone, in which the pitching is controlled by the torque positioning devices and a failure zone, in which the pitching is furthermore controlled by the centrifugal positioning devices.

It is noted that in this embodiment in the torsion positioning devices preferably comprise a spring with a digressive stiffness, such that the angle over which the blades are pitched is not linear related to the speed of the turbine, but more than linear related to the speed of the turbine. Thus, when the rotor speed increases, and thus the torque in the axle increases, the stiffness of the spring reduces. For example, at higher speeds an increase in speed of the rotor of for example 1 rotation a second, leads to further pitching the blades over an angle of 3 degrees, while the same speed increment at low speeds only leads to a further pitching of the blades over an angle of 1 degree.

Providing the above described embodiment with digressive torsion positioning devices is advantageous since the rotor blades require little pitching at lower speeds, and more pitching as the rotor runs near its optimal speed. The latter to keep the rotational speed of the rotor close to its optimal speed over wide range of wind speeds. Thus, when the torsion positioning devices pitch the blades under normal operating conditions, they preferably provide more pitching with increased wind speed. It is observed that in this effect can also be achieved by providing the turbine with pitching devices with enable progressive pitching. In a further embodiment, such pitching devices can be combined with digressive spring devices and/or digressive spring devices which are pre stressed.

A wind turbine according to the first aspect of the invention is especially suited for use with small wind turbines with a rotor diameter below approximately 10 m, in particular for use with wind turbines with a wind rotor diameter of 3-6 m.

It is noted that the pitch adjustment devices and the gondola are mounted such that they are rotated about, and relative to, the rotor axle in a direction perpendicular to the longitudinal axis of the rotor axle.

When seen in the longitudinal direction of the axle, the pitch adjustment devices and the gondola can thus each be rotated over an angle between a first position in which they do not pitch the blades, and a second position. When moved from the first position to the second position, the gondola moves in a first direction similar to the rotational direction of the rotor, and the pitch adjustment devices move in a second direction, opposite to the rotational direction of the rotor.

When both the pitch adjustment devices and the gondola are in their respective second positions the pitch of the blades is at a maximum.

Preferably, stops are provided to physically limit the movement of the pitch adjustment devices and the gondola from movement beyond their second position.

In the embodiment shown, the pitch adjustment devices interact with a bevelled sprocket mounted on a rotor blade axle. In an alternative embodiment, multiple gears may be provided on the gondola such that the rack gear of the pitch adjustment devices engages a first sprocket which in turn engages a second sprocket, etc. which engages a sprocket mounted on the blade axle. Also, the blade and the sprocket mounted on the gondola may be connected for example via a chain. Other mechanical connections are possible.

It is observed that a wind turbine according to the first aspect of the invention can be mounted on a free standing mast. However, the light and compact design makes a wind turbine according to the first aspect of the invention highly suited for mounting on buildings. The wind turbine can for example be placed on a roof a building or can be hung under a balcony or can be mounted to a wall. The wind turbine can be mounted such that, during use, the rotational axis of the rotor is essentially parallel to the wind flow and the ground. In an alternative position the wind turbine is mounted in a position with its rotational axis at an angle to the ground and for example parallel to a slanted roof surface to optimally engage a wind flow running along the roof or wall surface.

In a preferred embodiment, the turbine is supported by a flexible mast such that, at zero wind conditions, the rotational axis of the rotor extends at an angle with the horizontal. When seen from the side at zero wind conditions, the wind turbine seems to lean forward. During use, the turbine is subjected to a wind load and the flexible mast bends. Due to the bending of the mast, the nacelle is pivoted backward. Preferably, the nacelle is supported such that when the nacelle is pivoted backward at nominal wind conditions, the angle of the rotational axis with the flow is reduced to about zero.

In a preferred embodiment according to the first aspect of the invention, the pitch adjustment devices comprise one or more gear racks for interacting with bevelled gears of the pivotably mounted rotor blades. By moving the gondola and the pitch adjustment devices relative to each other the gears of the rotor blades run along the gear racks and thus the blades are pivoted about their longitudinal axis.

Both the centrifugal positioning devices and the torsion positioning devices enable rotating the pitch adjustment devices and the gondola relative to each other. Since both the centrifugal positioning devices and the torsion positioning devices interact via the one or more gear racks with the bevelled gears of the rotor blades the pitch adjustment system is of a compact design.

Thus a compact pitch adjustment system is provided which allows for pitching of the blades in relation to the torque transferred by the rotor axle and the speed of the rotor. The pitch adjustment system thus enables pitching of the blades via the torsion devices at normal wind speeds, for driving the generator at its optimal speed, as well as pitching of the blades at high wind speeds via the centrifugal devices, to prevent rotor speeds which might damage the rotor and or the electrical generator.

In the field of wind turbines, the optimal rotational speed of a rotor is normally expressed as the ration between speed of the rotor blade tip and the wind speed. A wind turbine according to the first aspect of the invention, in particular a wind turbine with a pitching device according to the first aspect of the invention, has an optimal speed of between 3 and 6, preferably between 4 and 5, preferably is about 4.5.

A wind turbine according to the first aspect of the invention is provided with pitch adjustment devices which allows for driving a small and compact wind turbine having a nominal speed at wind speeds between 9 and 11 m/s, preferably of about 9 m/s. Most small and compact wind turbines known are provided with a generator which requires wind speeds of 12 m/s or higher to attain their nominal speed. Since the average wind speed in urban areas is low, a wind turbine according to the first aspect of the invention will over a year run more often at its nominal speed than wind turbines known, and thus allows for a higher yearly yield.

It should be appreciated that the figures are not drawn to scale. Also, it should be appreciated that selected elements of each figure may not be represented in proportion to other elements in that figure. In addition, the embodiments discussed herein are merely presented as examples, and should in no way limit the specific composition of the wind turbine according to the first aspect of the invention.

According to a first aspect, the invention furthermore provides a wind turbine, comprising a nacelle and a rotor (4), wherein the rotor comprises:

a rotor axle (9) which is rotatably supported in the nacelle such that the rotor is rotatable about a rotor rotational axis;

two or more rotor blades (8) each having a base end (8a) and a tip end (8b);

a gondola (10) mounted on said rotor axle (9) and provided with a support member for each rotor blade, each rotatably supporting the base end (8a) of a rotor blade (8) such that a pivot axis (108) of that blade extends in a radial direction relative to the rotational axis of the rotor and allowing the blade to be moved about its pivot axis;

a cable (101) for each rotor blade (8) which cables (101) are each with one end connected to the rotor blade, preferably the base end (8a) of the rotor blade, and with their opposite end to the rotor axle or to a body mounted on the rotor axle, for transferring at least part of the centrifugal forces to which the blade is subjected during rotation of the turbine from the blade the rotor axle, such that each blade is essentially supported by the cable against movement in the radially outward direction; and pitch adjustment devices for moving the blades about their pivot axis, for example for adjusting the angle of the blades relative to the wind in relation to the rotational speed of the wind turbine.

Figure 8:
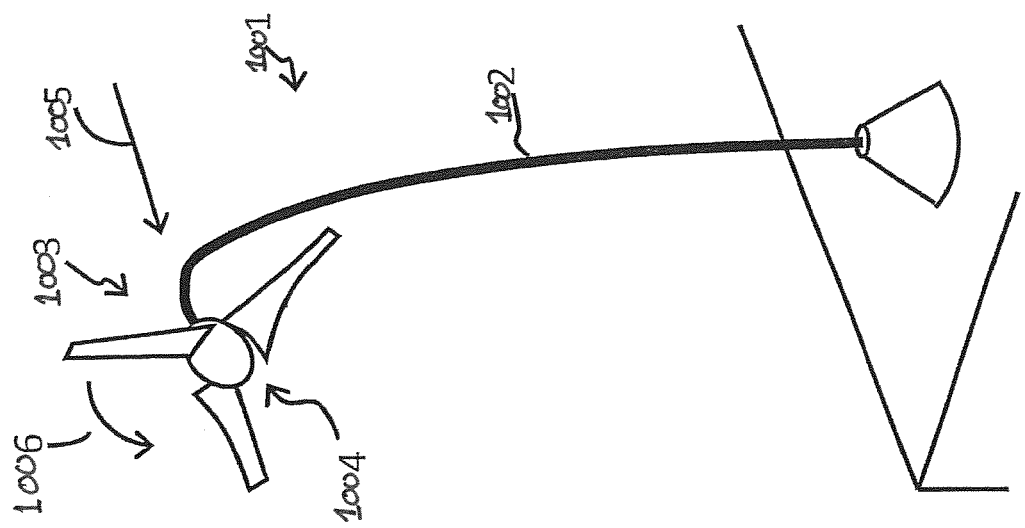
FIG. 8 shows a perspective view of a wind turbine according to the second aspect of the invention.

FIG. 8 shows an embodiment of a wind turbine 1001 according to the second aspect of the invention. The particular wind turbine 1001 shown comprises a mast 1002 which pivotably supports a nacelle 1003, and a rotor 1004 which is pivotably mounted in the nacelle such that it can be driven by the wind in a rotational direction indicated with arrow 1006.

The particular wind turbine shown is of the down wind type. The second aspect of the invention can be used with other types of wind turbines as well. With the down wind type the mast supporting the wind turbine is, at a first end, pivotably mounted in a holder which is located on the flat roof of a building. The holder supports the mast such that it is pivotable about a vertical axis. In an alternative embodiment, the mast is for example mounted to a wall or the turbine is supported by a free standing mast or structure instead of on a building.

At a second end the mast 1002 supports the nacelle 1003. The second end is located at a radial distance relative to the vertical pivot axis of the mast in the holder. Thus, when the wind turbine, more in particular the nacelle, is subjected to a wind flow, the mast pivots until the nacelle is positioned in a down wind position relative to the vertical pivot axis of the mast. In this down wind position, the rotor of the wind turbine is positioned to engage the wind flow.

Preferably the mast supporting the nacelle is made from a flexible material such that sudden changes in wind speed are at least partially absorbed by bending of the mast. Furthermore, a flexible mast limits the transfer of vibrations from the nacelle to for example the building the wind turbine is mounted to.

Figure 9:
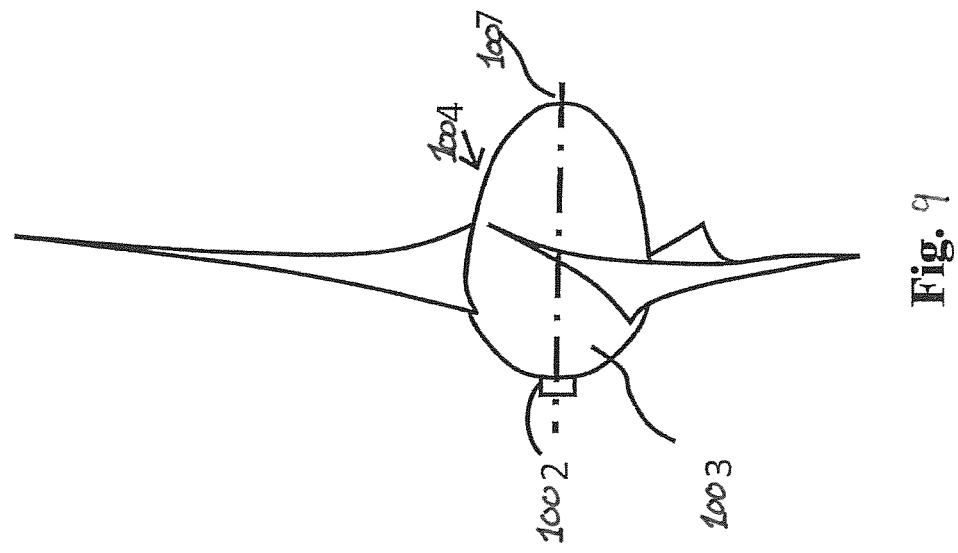
FIG. 9 shows a side view of the nacelle and rotor of the wind turbine of FIG. 8.

The rotor of the particular embodiment shown is provided with three rotor blades 1008. Via the blades, the rotor is driven by a wind flow, indicated with arrow 1005, such that the rotor is driven in a rotational direction, indicated with arrow 1006, about a rotor rotational axis of the rotor, indicated with line 1007 in FIG. 9.

Figure 10:
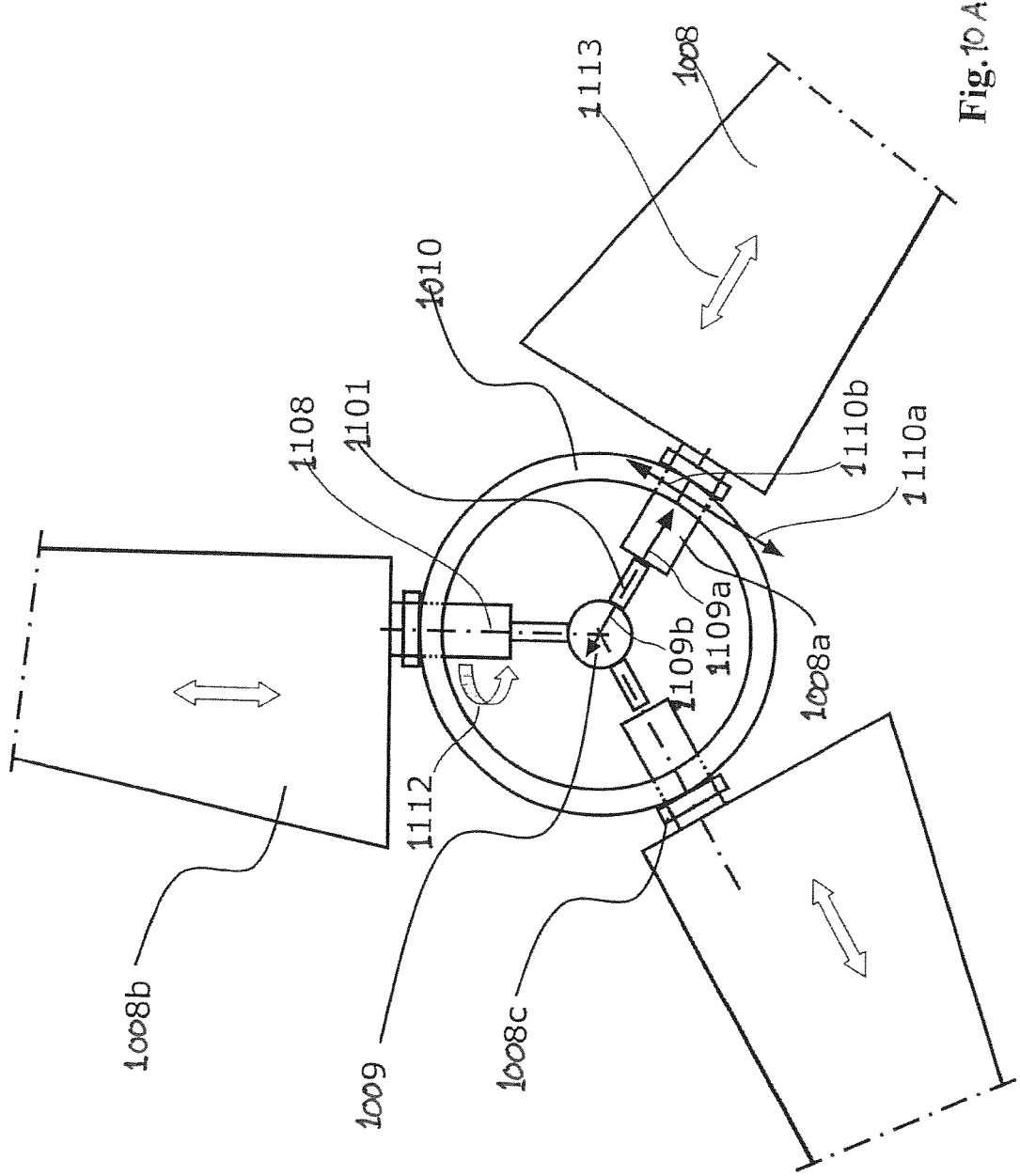
FIG. 10A shows a close up of a gondola supporting the blades according to the second aspect of the invention.
FIG. 10B shows an exploded view of the rotor of the wind turbine of FIG. 8.

FIG. 10A shows a frontal view of part of a wind turbine according to the second aspect of the invention. The figure depicts the rotor axle 1009, shown in cross section, the gondola 1010 supporting the blades, of which only the base ends 1008a are shown, and the cables 1101 connecting the base ends 1008a to the rotor axle 1009.

Figure 10B:
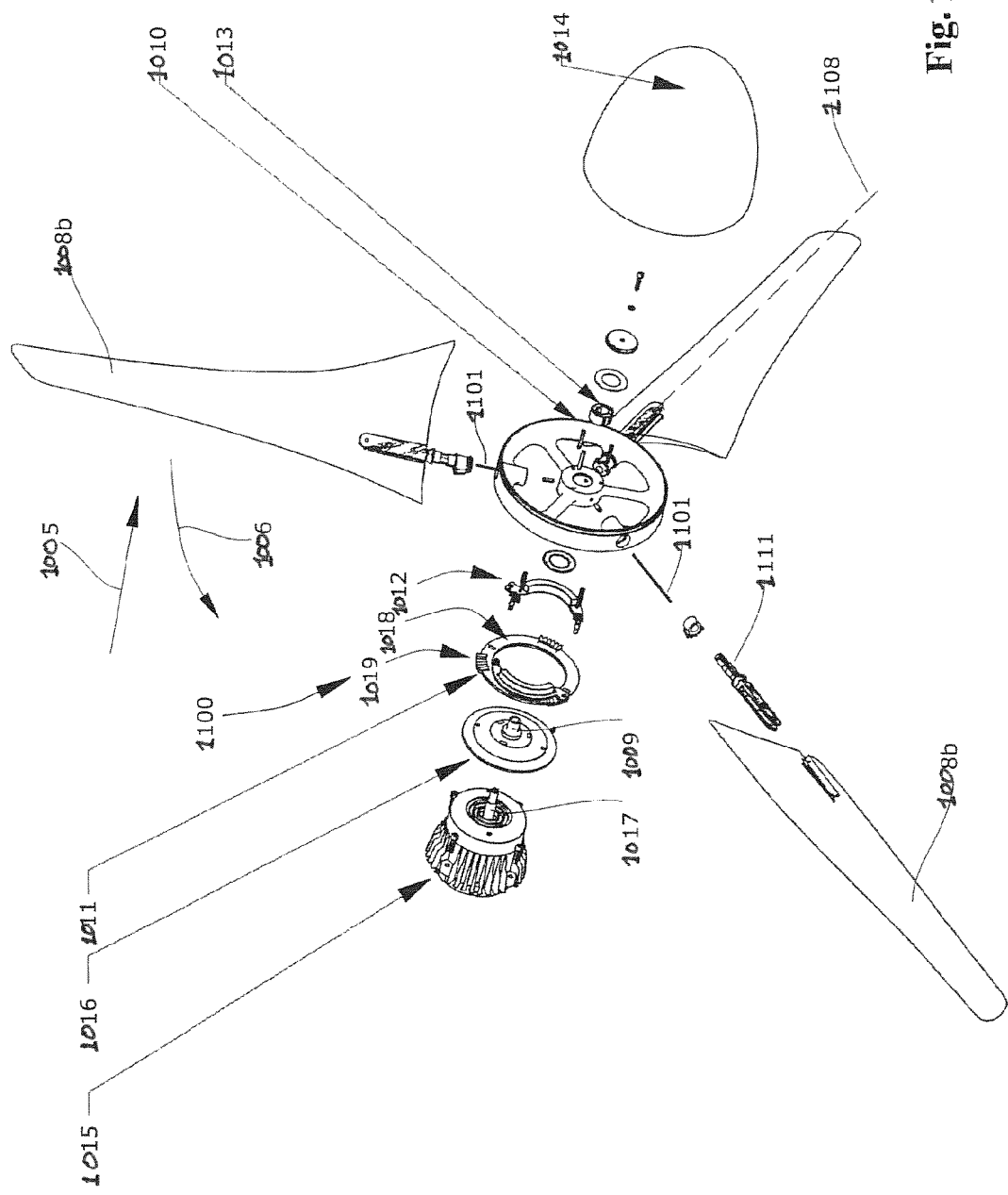

FIG. 10B shows an exploded view of the wind turbine shown in FIGS. 8 and 8, the wind turbine comprising blades supported by cables according to the second aspect of the invention. The particular embodiment shown differs from the embodiment shown in FIG. 10A in that the cables 1101 supporting the blades 1008 in the radial direction are connected to the gondola 1010, in particular to an inner ring of the gondola. The gondola is in turn mounted on the rotor axis, in the particular embodiment shown via a flexible element. In the embodiment shown in 9A the cables 1101 are connected to the rotor axle 1009 directly.

In the particular embodiments shown in FIGS. 10A, and 10B, the base ends 1008a of the blades 1008 are each provided with a stop 1008C, positioned radially outside the gondola 1010, to position the blades in a radial direction relative to the gondola. The stops support the blades on the outside surface of the gondola 1010, as is shown in FIG. 10A, and thus keep the base ends of the blades at a distance from the rotor axle.

The gondola 1010 is provided with support elements, in the embodiment shown in the form of openings for receiving the base ends 1008a of the rotor blades 1008 and for rotatably supporting them in a roller bearing fashion, such that the blades can be moved in a direction parallel to their pivot axis, indicated with arrow 1113, and rotated about their pivot axis, indicated with arrow 1112. Preferably the inside surface of the support openings and the outside surface of the blade base ends supported in the openings are provided with low friction surfaces to facilitate rotating the blades about their pitch axle, indicated with arrow 1112. In an alternative embodiment, the openings are provided with roller bearings for supporting the outside surface of the base end of the rotor blades.

The rotational force generated by the blades subjected to an air stream is directed tangentially to the rotor axle, more in particular to the gondola. In FIG. 10A this force is indicated for one blade with vector 1110A. This force extends in the plane of the drawing, i.e. a plan perpendicular to the rotational axis of the rotor. The gondola supports the blade in the tangential direction, and thus enacts a force upon the base end of the blade, which force is indicated with vector 1110B and which is of the same length but of opposite direction compared to vector 1110A. It is observed that the blades 1008 are mounted in the gondola in a way that allows for movement in a direction parallel to the pivot axis 1108. The gondola 1010 supports, and thus positions, the blades 1008 perpendicular to the pivot axis 1108 of each blade. It is furthermore observed that the gondola supports the blade in a direction parallel to the wind flow. These forces are not depicted in the figure. The interaction of the forces is highly simplified for explanatory reasons.

The gondola of a wind turbine according to the second aspect of the invention is mounted either directly or indirectly on the rotor axle such that the rotational force generated by the blades is transferred via the gondola to the rotor axle. Since the gondola does not have to support the, comparatively strong, centrifugal forces, it can be of a simple and light design.

The wind turbine according to the second aspect of the invention is furthermore provided with pitch adjustment devices for pitching the blades about their pivot axis. The system is not shown in FIG. 10A. A particular pitch adjustment system according to the second aspect of the invention is shown in FIGS. 10B-12.

It is observed that many pitch adjustment systems are known form the prior art, and a blade support system based on cable support according to the second aspect of the invention is not limited to a single pitch adjustment system comprising specific pitch adjustment devices. One thing almost all pitch adjustment systems have in common, is that they comprise devices which engage part of the rotor blade, in most case part of a stem shaped base end of the rotor blade. The devices, which are for example part of a linkage mechanism, are moved to rotate the blades about their pivot axle, and thus for example adjusting the angle of the blades relative the nacelle, and thus to the direction of the wind flow, in relation to the rotational speed or torque exerted on the axle power in the axis of the wind turbine.

When the rotor is rotated by the wind, the blades are subjected to a centrifugal force directed in a radially outward direction relative to the rotor axle 1009. This force is indicated for one blade with vector 1109A in FIG. 10A. When the rotor is rotated, the cables 1009 support the blades in the radial direction, and prevent the blades from substantial movement in the radially outward direction. During rotation of the rotor, the cable enacts a force directed radially inward upon the base of the blade. In FIG. 10A, this force is indicated with vector 1109*b*, which has the same size but extends in an opposite direction compared to vector 10109A. It is observed that the cable may stretch while supporting the blade, however, the elongation of the cable is small compared to the length of the blade, such that the blade will not move substantially in the radial direction.

In an alternative embodiment, the cables are resiliently supported at the rotor blade and/or at the rotor axle, such that when the wind turbine is at rest the cable pulls the stop of the blade against the gondola, and when the wind turbine is rotated at working speed, the resilient support is transformed such that the cable moves in the radially outward direction and the stop comes free form the gondola.

For example, the cables can be connected to a flexible ring mounted on the rotor axle, which ring transforms, i.e. is stretched, when the rotor is rotated and the rotational forces pull the blades, and thus the cables, in an outward direction. Thus the blades move in the radially outward direction and the stops of the blades come free form the gondola.

The cables 1101 of the embodiment shown are comparatively long with respect to their width. The dimension and the E-modulus of a cable according to the second aspect of the invention are such that the cables offer no or little resistance against twisting about their longitudinal axis, in particular when twisted over a small angle. Thus, when supporting the blades during rotation of the gondola, the cables do allow pivoting of the blades about their pivot axle.

It is clear from the above that using a cable for mounting the blades is advantageous in that the cables generate minimal friction when pivoting the blades. Thus, the force needed for rotating the blades about their pivot axle is limited and the pivot devices can be of a simple and light design.

In the particular embodiment shown in FIG. 10A, the base ends 1008*a* of the blades are each provided with a stop 1008C, positioned radially outside the gondola, to position the blades in a radial direction relative to the gondola. The stops support the blades on the outside surface of the gondola 1010 and thus keep the base ends of the blades at a distance from the rotor axle.

In an alternative embodiment, support elements alternative to the stops shown may be provided for positioning the blades in a radial direction relative to the gondola. For example, a support element may be provided which supports the base end of the base end of the blade against a radially inward direction relative to the rotor axle, and which is for example connected to the gondola or to the rotor axle. The support element is for example provided with an opening for receiving the cable supporting the base end of the blade. The support thus supports the outer area of the base end, while the cable can still connect the centre of the base end of the blade to the rotor axle, as shown in FIG. 10A.

In an alternative embodiment, the cable connecting the base of the rotor blade to the rotor axle can also extend into a hollow shaft of a rotor blade. Thus, the cable may extend from the rotor axle to beyond the gondola, and in principle along the entire inside of the blade.

In the preferred embodiment shown in FIG. 10A, each cable 1101 extends between the base end 1008*a* of the blade 1008 and the rotor axle 1009 in a direction essentially parallel to the pivot axis 1108 of the blade. Furthermore, the cables 1101 coincide with the pivot axis 1108 of the blade 1008 they support. Thus, when the blade is rotated about its pivot axis, the cable is twisted about its longitudinal axis only.

In an alternative embodiment, the cable may extend at an angle with the pivot axis, and/or out the pivot axis. When the blade is pivoted, the cable will be subjected to more complicated stress patterns than a blade in line with the pivot axis, and thus these cables will wear more rapidly.

The cables in the embodiment shown are furthermore dimensioned such that the cable is fully extended and under pre-tension when the stop is positioned against the gondola. Thus, the stop and the cable in cooperation essentially prevent the blade from excessive axial movement.

In an alternative embodiment, in which the cables are resiliently supported at the rotor blade and/or at the rotor axle, the resilient support may provide the tension which pulls the stop against the gondola when the rotor is at rest or is rotated at low speeds.

Due to the tension in the cable, or the resilient cable support devices, the cable pulls the blade inward, such that the stop rests on the outside of the gondola. The tension in the cable is high enough to keep the blades with their stops pulled against the gondola when the rotor is in rest or at low rotational speed relative to the rotational axis of the rotor, i.e. along the axis of the blade. The blades are essentially prevented from movement in the radially outward direction when the rotor is rotated at a working speed.

When the rotor is rotated, the blades are subjected to centrifugal forces which force the blades in a radially outward direction relative to the rotor axle. Thus, the tension in the cable rises when the rotational speed of the rotor rises, and the cable ultimately stretches in its axial direction. In the preferred embodiment shown, the cable is dimensioned such that, when the wind turbine is rotating at working speeds, the centrifugal forces acting upon the cables are high enough to elongate the cable and let the stop come free form the gondola. Therefore, when the rotor is rotated at working speed, the blade is supported in the radial direction by the cable only. When rotating the blade about its pivot axis there is no friction between stop and gondola. The reduced friction allows for a simpler and lighter pivoting system FIG. 10B shows an exploded view of the rotor of the wind turbine shown in FIGS. 8 and 9. The exploded view shows the main parts of the rotor 1004, i.e. a rotor axle 1009, three rotor blades 1008 each having a base end 1008a and a tip end 1008b, a gondola 1010 for rotatably supporting the blades, cables 1101 for supporting the blades in a radially outward direction, and pitch adjustment devices 1100 for pitching the blades 1008 about their pivot axis 1108. Under normal operating conditions these parts are enclosed in a cone shaped housing part 1014 and the nacelle.

In the particular embodiment shown, the blades 1008 are supported in an outer part of the gondola 1010 and, the cables 1101 are with one end connected to the blades and with their opposite end to an inner part of the gondola. The gondola is in turn mounted coaxially and pivotably on the rotor axle such that the gondola is pivotable about the rotational axis of the rotor and relative to the pitch adjustment devices.

In the embodiment shown in FIG. 10B, the gondola has a central opening in which it receives the rotor axle. Resilient devices, for example a rubber ring, are clamped between the rotor axle and the gondola to connect the gondola to the axle. This allows for a secure and stable support of the gondola by the rotor axle, while the gondola can be rotated relatively to the rotor axle also, over a limited angle that allows for a pitch of the blade of preferably 0 to 30 degrees. The rotational movement relative to the rotor axle, and thus to the pitching devices, is used for pivoting the blades, as will be explained further on. Furthermore, by connecting the gondola via flexible devices to the rotor axle, when at working speed, vibrations in the gondola due to its rotation are dampened.

In the particular embodiment shown, the base end 1008a of each blade comprises an insert element 1111. The insert element is made out of a synthetic material or out of metal and is with one end connected to the curved blade surface and is with its opposite end 1008a, which forms the base end of the blade, mounted in the gondola 1010.

The base ends 1008a of the blades in the particular embodiments shown are each provided with a stop 1008C, positioned radially outside the gondola. The stop positions the blades in a radial direction relative to the gondola. The stops support the blades on the outside surface of the gondola 1010, as is shown in FIG. 10A, and thus keep the base ends of the blades at a distance from the rotor axle. The cables pull the blades with their respective stops against the outside of the gondola when the rotor is at rest.

The gondola 1010 is provided with support elements, in the embodiment shown in the form of openings, for receiving the base ends of the rotor blades and for rotatably supporting them in a roller bearing fashion. Preferably the inside surface of the support openings and the outside surface of the part of the blade supported in the openings are provided with low friction surfaces to facilitate rotating the blades about their pitch axle. In an alternative embodiment, the openings are provided with roller bearings for supporting the outside surface of the base end of the rotor blades.

The rotor axle 1009 of the rotor 1004 coincides with the rotational axis of the rotor 1007, i.e. the rotor axle has a central longitudinal axis about which it rotates in mounted condition, and which coincides with the rotational axis of the rotor. During use, the rotational axis of the rotor is positioned essentially parallel to the wind flow.

The wind turbine shown further comprises an electrical generator 1015 for generating electrical energy. The electrical generator comprises a stator and a rotor, which are not shown in the exploded view. In the embodiment shown, the rotor is provided with a mounting disc 1016 which, amongst others, supports the pitch adjustment devices. In a preferred embodiment the stator of the electrical generator is mounted in the nacelle, and the rotor of the electrical generator is mounted on the rotor axle 1009 of the wind turbine. In such an embodiment the rotor preferably replaces, or is integrated with, the mounting disc 1016 as a support devices. For example the pitch adjustment devices for adapting the position of the blades can then be mounted on the rotor of the electrical generator. Thus the overall number of components and the weight of the wind turbine are reduced.

The rotor axle 1009 of the wind turbine shown is pivotably supported in the nacelle. In the particular embodiment shown, the rotor axle 1009 is hollow. The hollow rotor axle is mounted over a supporting axle 1017 extending form the generator 1015, and connected to the rotor part of the generator, which generator is stationary mounted in the nacelle 1003. Thus, the rotor 1004 of the wind turbine is pivotably supported in the nacelle 1003 by the rotor axle 1009 and directly drives the electrical generator, more in particular the rotor part of the electrical generator.

The gondola 1010 of the wind turbine 1001 is coaxially and pivotably connected to the rotor axle 1009. The gondola 1010 supports three rotor blades such that they extend in an essential radial direction relative to the rotational axis of the rotor. The gondola is pivotably connected because it is rotatable about the rotor axle. The gondola is coaxially connected because it is rotatable about its centre axis, i.e. the axis which is located central to the three rotor blades mounted in the gondola. Thus, the gondola is pivotable about the rotational axis 1007 of the turbine rotor 1007, and thus able to move the blades about the rotational axis, relative to the rotor axle.

In the embodiment shown the gondola is a ring shaped body, more in particular a wheel shaped body having a ring, a hub and spokes connecting the ring to the hub. The gondola functions also as a frame to which for example the cone 1014 is mounted. In alternative embodiment the gondola body is for example rectangular shaped or star shaped frame part which is preferably partially or entirely enclosed within a housing such as for example the cone shaped part 1014.

The rotor blades 1008 are pivotably mounted in the gondola 1010 such that the pitch of the rotor blades is adjustable. To alter the pitch of a rotor blade, the blade is pivoted about its pivot axis. Adjusting the pitch of a blade, i.e. the orientation of the blade, alters the aerodynamics and the efficiency of the blade. Pitching the blade thus influences the efficiency at which wind energy is transformed into mechanical energy.

In the particular embodiment shown, the pitch adjustment devices comprise a ring shaped body 1018 provided with three gear racks 1019, one for each rotor blade. The gear racks extending in a circumferential direction about the rotational axis of the rotor. In an alternative embodiment, instead of a ring shaped body the pitch adjustment devices comprise for example a rectangular or star shaped frame for supporting the pitch adjustment devices which interact with the rotor blades.

The rotor blades each comprise a bevelled gear 1020 at their base end for cooperation with a gear rack 1019. In the assembled state of the rotor, the bevelled gears engage the gear racks of the pitch adjustment devices. Thus, when the gondola is rotated about the rotational axis relative to the pitch adjustment devices, the bevelled gear runs along the gear rack and the pitch of the rotor blade is adjusted. The combination of a gear rack with a bevelled gear allows for compact pitch adjustment devices which enables pitching over a great angle, for example over a 90 degree angle. It is noted that in the embodiment shown the combinations of gear racks and gears are located at similar radial distances to the rotational axis of the gondola. Alternative embodiments are possible wherein for example the gear racks and bevelled gears are for each blade located at a different distance to the rotational axis of the gondola as shown in FIGS. 8 and 10b.

With such a wind turbine the pitch of the rotor blades is adjusted by rotating the pitch adjustment devices and the gondola relative to each other about the rotational axis of the rotor. The gondola and the pitch adjustment devices are rotated relative to each other by the torsion positioning devices, supporting the gondola, and the centrifugal positioning devices connected to the centre positioning devices. Both interact with the blades via the pitch adjustment devices, which allows for a compact design of the rotor.

FIG. 11 shows a close up of the centrifugal positioning devices 1012 of the wind turbine supporting the ring shaped pitch adjustment devices 1011. In the preferred embodiment shown, the centrifugal positioning devices comprise centrifugal bodies in the form two centrifugal arms 1021, which are located on opposite sides of the rotor axle 1009.

Both arms 1021 are at one end 1022 pivotably connected to the rotor of the wind turbine. In the embodiment shown the arms are pivotably connected to mounting plate 1016, which is mounted on the rotor axle 1009. The opposite second end 1023 of each arm 1021 is connected to the pitch adjustment devices via a cam/cam shaft connection.

Since the first end 1022 of each centrifugal arm is pivotably connected, the other end 1023 of each arm is movable between a first position near the rotational axis and the second position at a distance from the rotational axis. FIG. 11 shows both arms in the first position. FIG. 12 shows both arms in the second position. When the pivotable arms move from the first position to the second position, the pitch adjustment devices are rotated about the rotational axis of the rotor in a direction contrary to the rotational direction of the rotor.

In the preferred embodiment shown the pitch adjustment devices are pivotably mounted on the mounting plate 1016, i.e. can move about the rotational axis of the rotor, which mounting plate is mounted on the rotor axle 1009. In an alternative embodiment, the pitch adjustment devices are for example pivotably supported by the centrifugal positioning devices or are pivotably mounted on the rotor axle or in the housing of the rotor. In a further alternative embodiment, the arms are provided such that they extend at an angle to the rotational axis of the rotor or in the longitudinal direction of the rotational axis of the rotor.

Resilient devices in the form of spring elements force the movable end of the centrifugal arm in the position near the rotational axis. When the rotor is driven by the wind a centrifugal force acts on the centrifugal bodies, i.e. the arms. When the rotational speed of the rotor axle surpasses a threshold value, the centrifugal force is high enough to overcome the resilient force of the spring elements, and the movable ends of the centrifugal arms move out of the first position towards, and ultimately into, the second position.

The spring devices are pre stressed, such that only when the speed of the rotor surpasses a threshold value, the arms move from the first to the second position and the pitch adjustment devices are rotated about the rotational axis relative to the gondola supporting the rotor blades. By rotating the pitch adjustment devices relative to the gondola, the tooth racks are moved along the bevelled sprockets of the rotor blades and the pitch of the rotor blades is adjusted to reduce the efficiency of the rotor and limit the increase in rotational speed of the rotor.

In the particular embodiment shown, the pitch adjustment devices are designed to pivot the blades, more in particular the top end of the blades, such that the faces of the blades are positioned essentially parallel to the wind flow when the arms are in the second position. In this so called feather position, the efficiency of the rotor blades is near zero. The pitch adjustment devices in combination with the centrifugal position devices thus form an efficient device for topping off the maximum speed of the rotor.

Figure 13:
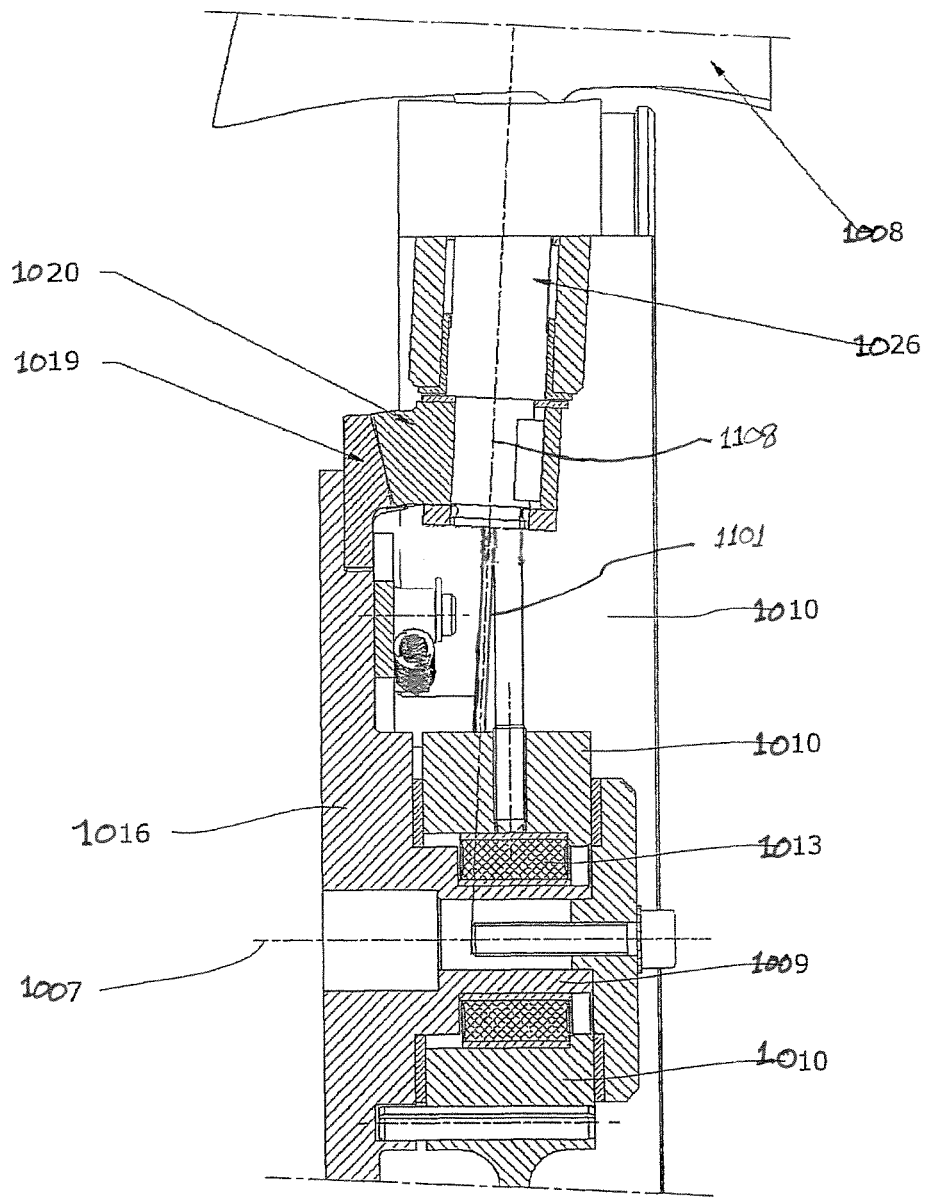
FIG. 13 shows a cross sectional side view in close up of the rotor of the wind turbine of FIG. 8.

FIG. 13 shows a side view in cross section which depicts the gondola 1010 which is mounted via torsion positioning devices 1013 on the rotor axle 1009. The figure furthermore shows a blade 1008 which has an axle 1026 which is pivotably supported in the gondola 1009, such that the bevelled gear 1020 which is mounted on the blade axle 1026 interacts with the gear rack 1019 mounted on the mounting disc 1016.

The position of the gondola 1010 relative to the rotational axis of the rotor is controlled by the torsion positioning devices. In the preferred embodiment shown, the gondola 1010 has a central opening in which it receives the rotor axle 1009. The torsion positioning devices shown comprise resilient devices in the form of a rubber ring or cylinder 1013. The rubber cylinder 1013 is mounted on the section of the rotor axle 1009 received in the opening of the gondola 1010. The gondola is in turn mounted on the rubber cylinder. The torsion positioning devices of the rotor thus connect the gondola 1010 to the rotor axle 1009.

During use, the rotor drives the generator. Thus, the rotor axle, which at one end is driven by the rotor and at its opposite end drives the electrical generator, is subjected to a torque. The gondola is mounted on the torsion devices, in the particular embodiment shown via a rubber ring, which in turn are mounted on the axle. The rotational energy generated by the blades is transferred via the gondola, through the torsion devices to the axle. Thus, the torsion devices are subjected to torque. Due to the torque, the torsion devices are stretched and the gondola rotates in the rotational direction of the rotor about the rotational axis of the rotor and relative to the pitch adjustment devices and the rotor axle. When the wind speed increases more electrical energy is generated, the torque in the axle increases, the gondola rotates further about the rotor axle relative to the pitch adjustment devices and the angle over which the blades are pitched increases.

In a preferred embodiment, the torsion positioning devices comprise non linear spring elements, such that the stretching more than linear increases with an increment of the torque to which the spring element is subjected. Thus the rotation of the gondola relative to the rotor axle is less at low wind speeds and increases with higher wind speeds. Such torsion positioning devices provide minimal pitching of the blades at low wind speed and increased pitching when at higher wind speeds.

In an alternative embodiment, linear resilient devices are combined with pitch adjustment devices, preferably the rack and sprockets, which pitch adjustment devices are shaped such that the pitch progressively increases with the wind speed. Thus a reduced pitching effect at low wind speeds and an increased pitching effect at high wind speeds can be achieved with simple linear spring devices.

Preferably, the rotor is provided with a stop which blocks rotation of the gondola due to the torsion positioning devices in a direction contrary to the rotational direction of the rotor. Preferably, the torsion positioning devices comprise resilient devices which are pre stressed such that they force the gondola against the stop. Thus a threshold value is created and a minimum torque is required to enable rotation of the gondola relative to the pitch adjustment devices by the torsion positioning devices. Thus, little pitching at low speeds, which is beneficial because at low speeds, a large blade area is needed for picking up speed.

Furthermore, preferably a stop is provided which limits rotation of the gondola due to the torsion positioning devices in the rotational direction of the rotor to a maximum.

In a further embodiment, no stop for limiting the maximum torque is provided, such as to enable controlling the blade pitch and thus the load during normal operating conditions solely by torque and thus the torsion positioning devices. During emergency situations, when the rotor rotates at too high a rotational speed, the centrifugal positioning devices, in addition to the torsion positioning devices, control the blade pitch and pitch the blades into a safe position.

Preferably, the torsion positioning devices regulate the pitch of the blades at a low rotational speed and the centrifugal positioning devices regulate the pitch of the blades at a high rotational speed. When the speed of the rotor is zero, the rotor blades are positioned in what is called there initial position. When a rotor blade is pitched, it is pivoted about its longitudinal axis over an angle such that the blade in the pitched position is at an angle relative to the same blade when in its initial position.

In a preferred embodiment according to the second aspect of the invention, the torsion positioning devices enable a pitch adjustment of the rotor blades over a first angle, preferably over an angle of 0-30 degrees relative to the blade in its initial position, and the centrifugal positioning devices enable a further pitch adjustment of the rotor blades over a second angle, preferably over an angle of 30-90 degrees relative to the blade in its initial position.

In a further preferred embodiment, the torsion positioning devices comprise pre-stressed resilient devices, such that the rotor has three pitching zones.

In the first pitching zone the rotor rotates at low wind speeds, for example 0 to 9 m/s. In this zone the rotor blades are not pitched and remain in their initial position. In the second pitching zone the rotor rotates at optimal, or nominal, speed for driving the electrical generator, for example at wind speeds of 9 to 22 m/s. In this zone the pitch of the rotor blades is controlled by the torsion positioning devices. In the third pitching zone, for example at wind speeds higher than 22 m/s, the rotor speed is topped off to prevent damage to the rotor and/or electrical generator. In this zone the pitch is controlled by the centrifugal positioning devices which are preferably able to pitch the blades in a position in which the sides of the blades are positioned parallel to the wind flow.

The first pitching zone preferably stretches from the rotor starting to pick up speed, up to the rotor rotating at a speed preferably optimal for driving the generator. In this first zone, the speed of the rotor increases when the wind speed increases. Furthermore, the power generated by the electrical generator, which is driven by the rotor, increases when the rotor speed increases. Thus, the speed increase of the rotor in the first zone leads to an increase in power generated by the electrical generator, which leads to an increase in the torque in the rotor axle driving the generator.

The torsion devices controlling the position of the gondola are pre stressed. Therefore only when the rotational speed reaches a threshold value, the torque transferred from the gondola to the rotor axle is high enough to stretch the torsion devices. Due to the stretching, i.e. torsion, of the torsion devices, the gondola pivots relative to the pitch adjustment devices, which causes the blades to pitch. This is the starting point of the second pitching zone. In this zone, an increased loading of the generator will operate through the torsion positioning devices to pivot the blades of the rotor to reduce the speed thereof.

Due to the pitching of the blades, the efficiency of the rotor in picking up wind energy is decreased, and the increase of rotational speed is reduced. Preferably the rotor blades are pitched such that an increase in wind speed leads to none or only a little increase of rotational speed of the rotor. Thus an increase in wind speed only leads to a comparatively small increase in rotor speed, and thus allows for driving generator at, or close to, its optimal speed over a wide range in wind speeds. Preferably, the torsion positioning devices are designed to pitch the blades over an angle of 0 to 30 degrees relative to the initial position of the blades in the first pitching zone.

When the wind speed even further increases, the rotational speed of the rotor, more in particular of the rotor axle, reaches a second threshold value and the rotor enters the third pitching zone. In this zone, the centrifugal force acting on the centrifugal bodies is high enough to overcome the resilient force with which the centrifugal bodies are pressed into their first position near to the rotational axis. The centrifugal force thus forces the centrifugal bodies in a radial direction away from the rotational axis. The centrifugal bodies are coupled to the pitch adjustment devices such that their movement in the radial direction rotates the pitch adjustment devices about the rotational axis and relative to the gondola and the rotor axle. Thus the blades are further pitched. When the rotor speed is high enough, the centrifugal bodies are moved into their second position. When the centrifugal bodies are in the second position the pitch adjustment devices are positioned such that the pitch of the blades is at maximum, preferably at an angle of 90 degrees compared to the position of the blades when in the first pitching zone.

The pitching zones are defined by the pitching of the blades and the devices which control the pitching. Preferably, the different pitching zones do not overlap. However, it is noted that when for example digressive resilient devices are used as torsion positioning devices, and which are not pre-stressed, minimal pitching may already occur at low wind speeds even though pitching which significantly influences the speed of the rotor will only occur at higher rotational speeds. It is the significant pitching which is relevant for defining the pitching zones.

When linear spring devices are used which are not pre-stressed, the rotor has two speed zones instead of three. The first pitching zone stretches from the rotor starting to pick up speed, up to the rotor rotating close to its maximum speed. This zone thus covers the first two zones of the above example.

In the first speed zone the pitching of the blades starts when the rotor picks up speed, and increases when the wind speed increases. When the speed of the rotor reaches a threshold value, which is preferably close to the maximum advisable speed of the rotor, the centrifugal adjustment devices start pitching the blades. The centrifugal adjustment devices ultimately pivot the blades in their feather position to prevent damage to the turbine by high wind speeds.

In a further embodiment, the torsion positioning devices control the pitching of the blades up to and into their feather position, such as to enable controlling the blade pitch and thus the load solely by torque under normal operating conditions. In emergency situations, in which the rotational speed of the rotor gets too high and the wind turbine might get damaged, the centrifugal positioning devices further control the pitching of the blades. This control thus consists of two zones. A single normal operating zone, in which the pitching is controlled by the torque positioning devices and a failure zone, in which the pitching is furthermore controlled by the centrifugal positioning devices.

It is noted that in this embodiment in the torsion positioning devices preferably comprise a spring with a digressive stiffness, such that the angle over which the blades are pitched is not linear related to the speed of the turbine, but more than linear related to the speed of the turbine. Thus, when the rotor speed increases, in which case the torque in the axle increases, the stiffness of the spring reduces. For example, at higher speeds an increase in speed of the rotor of for example 1 rotation a second, leads to further pitching the blades over an angle of 3 degrees, while the same speed increment at low speeds only leads to a further pitching of the blades over an angle of 1 degree.

Providing the above described embodiment with digressive torsion positioning devices is advantageous since the rotor blades require little pitching at lower speeds, and more pitching as the rotor runs near its optimal speed. The latter to keep the rotational speed of the rotor close to its optimal speed over wide range of wind speeds. Thus, when the torsion positioning devices pitch the blades under normal operating conditions, they preferably provide more pitching with increased wind speed. It is observed that in this effect can also be achieved by providing the turbine with pitching devices with enable progressive pitching. In a further embodiment, such pitching devices can be combined with digressive spring devices and/or digressive spring devices which are pre stressed.

A wind turbine according to the second aspect of the invention is especially suited for use with small wind turbines with a rotor diameter below approximately 10 m, in particular for use with wind turbines with a wind rotor diameter of 1-6 m.

It is noted that the pitch adjustment devices and the gondola are mounted such that they are rotated about, and relative to, the rotor axle in a direction perpendicular to the longitudinal axis of the rotor axle.

When seen in the longitudinal direction of the axle, the pitch adjustment devices and the gondola can thus each be rotated over an angle between a first position in which they do not pitch the blades, and a second position in which the blades are pitched. When moved from the first position to the second position, the gondola moves in a first direction similar to the rotational direction of the rotor, and the pitch adjustment devices move in a second direction, opposite to the rotational direction of the rotor. When both the pitch adjustment devices and the gondola are in their respective second positions the pitch of the blades is at a maximum.

Preferably, stops are provided to physically limit the movement of the pitch adjustment devices and the gondola from movement beyond their second position.

In the embodiment shown, the pitch adjustment devices interact with a bevelled sprocket mounted on a rotor blade axle. In an alternative embodiment, multiple gears may be provided on the gondola such that the rack gear of the pitch adjustment devices engages a first sprocket which in turn engages a second sprocket, etc. which engages a sprocket mounted on the blade axle. Also, the blade and the sprocket mounted on the gondola may be connected for example via a chain. Other mechanical connections are possible.

It is observed that a wind turbine according to the second aspect of the invention can be mounted on a free standing mast. However, the light and compact design makes a wind turbine according to the second aspect of the invention highly suited for mounting on buildings. The wind turbine can for example be placed on a roof a building or can be hung under a balcony or can be mounted to a wall. The wind turbine can be mounted such that, during use, the rotational axis of the rotor is essentially parallel to the wind flow and the ground. In an alternative position the wind turbine is mounted in a position with its rotational axis at an angle to the ground and for example parallel to a slanted roof surface to optimally engage a wind flow running along the roof or wall surface.

In a preferred embodiment, the turbine is supported by a flexible mast such that, at zero wind conditions, the rotational axis of the rotor extends at an angle with the horizontal. When seen from the side at zero wind conditions, the wind turbine seems to lean forward. During use, the turbine is subjected to a wind load and the flexible mast bends. Due to the bending of the mast, the nacelle is pivoted backward. Preferably, the nacelle is supported such that when the nacelle is pivoted backward at nominal wind conditions, the angle of the rotational axis with the flow is reduced to about zero.

In a preferred embodiment according to the second aspect of the invention, the pitch adjustment devices comprise one or more gear racks for interacting with bevelled gears of the pivotably mounted rotor blades. By moving the gondola and the pitch adjustment devices relative to each other the gears of the rotor blades run along the gear racks and thus the blades are pivoted about their longitudinal axis.

Both the centrifugal positioning devices and the torsion positioning devices enable rotating the pitch adjustment devices and the gondola relative to each other. Since both the centrifugal positioning devices and the torsion positioning devices interact via the one or more gear racks with the bevelled gears of the rotor blades the pitch adjustment system is of a compact design. Furthermore, the blades are supported by cables which allow for simple mounting of the blades in the gondola and a low friction when rotating the blades about their pivot axis during while the rotor is being rotated.

Thus a compact pitch adjustment system is provided which allows for pitching of the blades in relation to the torque transferred by the rotor axle and the speed of the rotor. The pitch adjustment devices thus enable pitching of the blades via the torsion devices at normal wind speeds, for driving the generator at its optimal speed, as well as pitching of the blades at high wind speeds via the centrifugal devices, to prevent rotor speeds which might damage the rotor and or the electrical generator.

In a preferred embodiment, the cables are provided with an connection body, for example a ball, at each end, which bodies are respectively placed in for example a recess provided in a body mounted on the rotor axle and a recess provided on the rotor blade to fix the cable in position.

Preferably, the blades are connected with to the rotor by the cables only. Thus, when the cable is removed, a blade can be slid in a radial direction out of the support in the gondola and removed from the rotor. Visa versa, when the rotor is assembled, the blades are slid into the supports and secured in position with the respective cables. Using the cables for securing the blades into place allows for easy assembly and disassembly of the rotor. This in turn facilitates installing the wind turbine on for example a roof or other difficult to reach location by transporting the turbine with disassembled blades, and assembling the turbine on location.

It is noted that the rotor blades of many wind turbines slightly deviate from a line perpendicular to the rotational axis of the rotor. Thus, the longitudinal axis, and therefore the pivot axis, of each blade does not extend at an angle of 90 degrees with the rotational axis but at an angle of for example 86 or 87, or even 80 degrees with the rotational axis. In an embodiment according to the second aspect of the invention, the blades of the wind turbine are mounted at an angle in the gondola such that the longitudinal axis of the blades extends at an angle with the rotational axis, for example an angle between 80-90 degrees, preferably of about 86 degrees, with the rotational axis. When the blades are moved in the radial direction, they are moved along their longitudinal axis. Thus, in the text the meaning of radial movement is not limited to movement in a direction perpendicular to the rotational axis, but also comprises movement in a direction at an angle to a line perpendicular to the rotational axis of the rotor, that is at an angle between 0 and 10 degrees to a line perpendicular to the rotational axis of the rotor.

The second aspect of the invention furthermore provides a gondola in the form of a ring shaped body, more in particular a wheel shaped body having a ring, a hub and spokes connecting the ring and the hub. The gondola allows for supporting the blades with cables in the radially outward direction, as well as supporting the blades such that they can be pivoted about the rotor axle. Thus the gondola combines a compact pitching system with a low friction support of the blades, comprising a bearing in the form of a cable, and thus provides an optimal pitching system for a wind turbine, in particular for a wind turbine for use in an urban area.

In the field of wind turbines, the optimal rotational speed of a rotor is normally expressed as the so called Tip Speed Ration (TSR), which is the ratio between the speed of the rotor blade tip and the wind speed. A wind turbine according to the second aspect of the invention, in particular a wind turbine with a pitching device according to the second aspect of the invention, has an optimal TSR of between 3 and 6, preferably between 4 and 5, preferably about 4.5.

A wind turbine according to the second aspect of the invention is provided with pitch adjustment devices which allows for driving a small and compact wind turbine having a nominal speed at wind speeds between 9 and 11 m/s, preferably of about 9 m/s. Most small and compact wind turbines known are provided with a generator which requires wind speeds of 12 m/s or higher to attain their nominal speed. Since the average wind speed in urban areas is low, a wind turbine according to the second aspect of the invention will over a year run more often at its nominal speed than known wind turbines.

It should be appreciated that the figures are not drawn to scale. Also, it should be appreciated that selected elements of each figure may not be represented in proportion to other elements in that figure. In addition, the embodiments discussed herein are merely presented as examples, and should in no way limit the specific composition of the wind turbine according to the second aspect of the invention.

The invention furthermore provides a wind turbine comprising features of the first aspect of the invention and features of the second aspect of the invention, more in particular a wind turbine combining a pitching mechanism according to the first aspect of the invention with a cable bearing according to a second aspect of the invention.

CLAUSES

Clause 1. Wind turbine, preferably of the down wind type, including an electrical generator, comprising:
 a nacelle,
 a mast, for pivotably supporting the nacelle,
 a rotor which is pivotably mounted in the nacelle such that the rotor is driven by the wind in a rotational direction about a rotor rotational axis of the rotor, which rotor comprises:
  a rotor axle for driving the generator, which coincides with the rotational axis of the rotor, and which is pivotably supported in the nacelle;
  a gondola;
  two or more rotor blades which extend in a radial direction relative to the rotational axis of the rotor, and which are pivotably mounted in the gondola such that the pitch of the rotor blades is adjustable;
  pitch adjustment devices for cooperating with the pivotably mounted rotor blades, which pitch adjustment devices are mounted coaxially and pivotably on the rotor axle such that the pitch adjustment devices are rotatable about the rotational axis of the rotor and relative to the rotor axle, to adjust the pitch of the rotor blades by rotating the pitch adjustment devices relative to the gondola and about the rotational axis of the rotor,
  centrifugal positioning devices for rotating the pitch adjustment devices about the rotor axis, which centrifugal positioning devices comprise:
   two or more centrifugal bodies which are each moveably connected to the rotor, preferably to the rotor axle, for movement between a first position near the rotational axis of the rotor and a second position at a distance from the rotational axis of the rotor;
   resilient devices which force the two or more centrifugal bodies in the position near the rotational axis, such that when the rotor is driven by the wind and the rotational speed of the rotor axle surpasses a threshold value, a centrifugal force acts on the two or more centrifugal bodies which forces the centrifugal bodies against the resilient force and from the first position towards the second position; and
   wherein the two or more centrifugal bodies are connected to the pitch adjustment devices such that when the centrifugal bodies move from their first position to their second position, they rotate the pitch adjustment devices about the rotational axis in a direction contrary to the rotational direction of the rotor;
 characterized in that, the gondola is coaxially and pivotably connected via torsion positioning devices to the rotor axle, such that the gondola is pivotable about the rotational axis of the rotor and relative to the rotor axle, and such that—when the rotor is driven by the wind and the rotor axle is subjected to a torque as it drives the generator, which torque is transferred via the torsion devices from the gondola to the rotor axle—the torsion devices are stretched due to the torque and the gondola rotates relative to the rotor axle in the rotational direction of the rotor and relative to the pitch adjustment devices to adjust the pitch of the rotor blades.

Clause 2. Wind turbine according to clause 1, wherein the torsion positioning devices enable a pitch adjustment of the rotor blades over a first angle, preferably over an angle of 0-30 degrees relative to the blades in their initial position, and the centrifugal positioning devices enable a pitch adjustment of the rotor blades over a second angle, preferably over an angle of 30-90 degrees relative to the blades in their initial position.

Clause 3. Wind turbine according to clause 1 or 2, wherein the torsion positioning devices comprise resilient devices which are pre stressed such that they force the gondola against a stop in a direction opposite the rotational direction of the rotor when driven by the wind Clause 4. Wind turbine according to one or more of the previous clauses, wherein the torsion positioning devices comprise digressive resilient devices.

Clause 5. Wind turbine according to one or more of the previous clauses, wherein the gondola has a central opening in which it receives the rotor axle, and wherein the torsion positioning devices comprise resilient devices, for example a rubber ring, which are mounted inbetween the rotor axle and the gondola to connect the gondola to the axle.

Clause 6. Wind turbine according to one or more of the previous clause, wherein the pitch adjustment devices comprise at least one gear rack extending in a circumferential direction about the rotational axis of the rotor, and the rotor blades each comprise a bevelled gear for cooperation with the at least one gear rack.

Clause 7. Wind turbine according to one or more of the previous clauses, wherein the centrifugal positioning devices comprise:

centrifugal bodies in the form of centrifugal arms, of which one end is pivotably connected to the rotor, preferably to the rotational axle of the rotor, such that another end of the centrifugal arm is movable between the first position near the rotational axis and the second position at a distance from the rotational axis;

the resilient devices of the centrifugal positioning devices force the movable end of each centrifugal arm in the position near the rotational axis, such that when the rotor is driven by the wind and the rotational speed of the rotor axle surpasses a threshold value, a centrifugal force acts on the centrifugal bodies and forces the movable end of each centrifugal arm against the resilient force and from the first position towards the second position; and wherein the centrifugal arms are connected to the pitch adjustment devices such that when the movable ends of the centrifugal arms move from the first position to the second position, they rotate the pitch adjustment devices about the rotational axis in a direction contrary to the rotational direction of the rotor.

Clause 8. Wind turbine according to one or more of the previous clauses, wherein a rotor of the electrical generator is mounted on the rotor axle for cooperating with a stator of the generator which is provided in the nacelle.

Clause 9. Wind turbine according to one or more of the previous clauses, wherein the wind turbine is of the down wind type and the mast has a first end, at which it is mountable in a holder for mounting the wind turbine to an object, for example to a building, such that the mast is pivotable about a vertical axis, and a second end at which the mast supports the nacelle, and which second end is located at a radial distance relative to the vertical pivot axis Clause 10. Method for pitching rotor blades of a wind turbine.

Clause 11. Wind turbine, comprising a nacelle and a rotor (4), wherein the rotor comprises:

a rotor axle (9) which is rotatably supported in the nacelle such that the rotor is rotatable about a rotor rotational axis;

two or more rotor blades (8) each having a base end (8a) and a tip end (8b);

a gondola (10) mounted on said rotor axle (9) and provided with a support member for each rotor blade, each rotatably supporting the base end (8a) of a rotor blade (8) such that a pivot axis (108) of that blade extends in a radial direction relative to the rotational axis of the rotor and allowing the blade to be moved about its pivot axis;

a cable (101) for each rotor blade (8) which cables (101) are each with one end connected to the rotor blade, preferably the base end (8a) of the rotor blade, and with their opposite end to the rotor axle or to a body mounted on the rotor axle, for transferring at least part of the centrifugal forces to which the blade is subjected during rotation of the turbine from the blade the rotor axle, such that each blade is essentially supported by the cable against movement in the radially outward direction; and pitch adjustment devices for moving the blades about their pivot axis, for example for adjusting the angle of the blades relative to the wind in relation to the rotational speed of the wind turbine.

Clause 12. Wind turbine according to clause 11, wherein the cable extends between the base end of the blade and the rotor in a direction essentially parallel to, and preferably coincide with, the pivot axis of that blade.

Clause 13. Wind turbine according to clause 11, wherein the cable devices are with one end secured to the rotor axle or to a body mounted on the rotor axle and with their opposite end to the blade, preferably the base end of the blade, such that when the blade is pivoted, one end of the cable is rotated relative to the opposite end of the cable and the cable is twisted.

Clause 14. Wind turbine according to one or more of the clauses 11-13, wherein the blades are supported in the radially outward direction by the cables only.

Clause 15. Wind turbine according to one or more of the clauses 11-14, wherein the blades are provided with a stop (8C) located on the radial outside of the gondola, to support the blade on the gondola against movement in the radial inward direction.

Clause 16. Wind turbine according to clause 15, wherein the cable is dimensioned such that, when the wind turbine is at rest the cable pulls the stop of the blade against the gondola, and when the wind turbine is rotated at working speed, the cable is elongated such that blade moves in the radially outward direction and the stop comes free form the gondola.

Clause 17. Wind turbine according to clause 15, wherein the cables are resiliently supported at the rotor blade and/or at the rotor axle, such that when the wind turbine is at rest the cables pull the respective stops of the blade against the gondola, and when the wind turbine is rotated at working speed, the resilient support is transformed such that the blades move in the radially outward direction and the stops come free form the gondola.

Clause 18. Wind turbine according to one or more of the clauses 11-17, wherein the gondola is an annular body, preferably a circular body, more preferably a wheel having a ring shaped body, a hub and spokes connecting the ring to the hub, which provides support for all rotor blades of the wind turbine.

Clause 19. Wind turbine according to one or more of the clauses 11-18, wherein the cable support devices are wires, for example synthetic wires or steel wires.

Clause 20. Wind turbine according to one or more of the clauses 11-19, wherein the bearing member supporting the blade in the blade support is a friction bearing.

Clause 21. Wind turbine according to one or more of the clauses 11-20, wherein the pitch adjustment devices comprise at least one gear rack extending in a circumferential direction about the rotational axis of the rotor, and the rotor blades each comprise a bevelled gear for cooperation with the at least one gear rack.

Clause 22. Wind turbine according to one or more of the clauses 11-21, wherein the pitch adjustment devices are mounted coaxially with and pivotably on the rotor axle such that the pitch adjustment devices are rotatable about the rotational axis of the rotor and relative to the gondola, wherein the pitch adjustment devices are connected with the blades supported in the gondola such that when pitch adjustment devices are rotated relative to the rotor axle, and thus relative to the gondola, about the rotational axis of the rotor, the pitch of the blades is adjusted.

Clause 23. Wind turbine according to clause 22, further comprising centrifugal positioning devices for rotating the pitch adjustment devices about the rotor axis, which centrifugal positioning devices comprise:

two or more centrifugal bodies which are each moveably connected to the rotor, preferably to the rotor axle, for movement between a first position near the rotational axis of the rotor and a second position at a distance from the rotational axis of the rotor;

resilient devices which force the two or more centrifugal bodies in the position near the rotational axis, such that when the rotor is driven by the wind and the rotational speed of the rotor axle surpasses a threshold value, a centrifugal force acts on the two or more centrifugal bodies which forces the centrifugal bodies against the resilient force and from the first position towards the second position; and wherein the two or more centrifugal bodies are connected to the pitch adjustment devices such that when the centrifugal bodies move from their first position to their second position, they rotate the pitch adjustment devices about the rotational axis, preferably in a direction contrary to the rotational direction of the rotor, and relative to the gondola such that the rotor blades are pitched.

Clause 24. Wind turbine according to clause 23, wherein the centrifugal positioning devices comprise:

centrifugal bodies in the form of centrifugal arms, of which one end is pivotably connected to the rotor, preferably to the rotational axle of the rotor, such that another end of the centrifugal arm is movable between the first position near the rotational axis and the second position at a distance from the rotational axis;

the resilient devices of the centrifugal positioning devices force the movable end of each centrifugal arm in the position near the rotational axis, such that when the rotor is driven by the wind and the rotational speed of the rotor axle surpasses a threshold value, a centrifugal force acts on the centrifugal bodies and forces the movable end of each centrifugal arm against the resilient force and from the first position towards the second position; and wherein the centrifugal arms are connected to the pitch adjustment devices such that when the movable ends of the centrifugal arms move from the first position to the second position, they rotate the pitch adjustment devices about the rotational axis in a direction contrary to the rotational direction of the rotor.

Clause 25. Wind turbine according to one or more of the clauses 11-24, wherein the blades are supported in an outer part of the gondola and, the cables are with one end connected to the blades and with their opposite end to an inner part of the gondola.

Clause 26. Wind turbine according to clause 25, wherein the gondola is mounted coaxially and pivotably on the rotor axle such that the gondola is pivotable about the rotational axis of the rotor and relative to the pitch adjustment devices, and wherein the pitch adjustment devices are mounted on the rotor axle and are connected with the blades supported in the gondola such that when the gondola is rotated relative to the rotor axle and thus relative to the pitch adjustment devices about the rotational axis of the rotor, the pitch of the blades is adjusted.

Clause 27. Wind turbine according to clause 26, further comprising torsion positioning devices, which connect the gondola to the rotor axle, such that when the rotor is driven by the wind and a torque is generated in the rotor axle, which torque is transferred via the torsion devices from the gondola to the rotor axle, the torsion positioning devices are subjected to shear forces which causes the gondola to rotate about the rotational axis of the rotor and relative to the pitch adjustment devices, preferably in the rotational direction of the rotor.

Clause 28. Wind turbine according to clause 27, wherein the gondola has a central opening in which it receives the rotor axle, and wherein the torsion positioning devices comprise resilient devices, for example a rubber ring, which are mounted between the rotor axle and the gondola to connect the gondola to the axle.

Clause 29. Wind turbine according to at least clauses 22 and 26, wherein the torsion positioning devices enable a pitch adjustment of the rotor blades over a first angle, preferably over an angle of 0-30 degrees relative to the blades in their initial position, and the centrifugal positioning devices enable a pitch adjustment of the rotor blades over a second angle, preferably over an angle of 30-90 degrees relative to the blades in their initial position.

Clause 30. Method for pitching rotor blades of a wind turbine.

The invention claimed is:

1. A wind turbine, including an electrical generator, comprising:
  a nacelle;
  a mast, for pivotably supporting the nacelle;
  a rotor which is pivotably mounted in the nacelle such that the rotor is driven by the wind in a rotational direction about a rotor rotational axis of the rotor, which rotor comprises:
    a rotor axle for driving the electrical generator, which coincides with the rotational axis of the rotor, and which is pivotably supported in the nacelle;
  a gondola;
  two or more rotor blades which extend in a radial direction relative to the rotational axis of the rotor, and which are pivotably mounted in the gondola such that the pitch of the rotor blades is adjustable;
  pitch adjustment devices for cooperating with the pivotably mounted rotor blades, which pitch adjustment devices are mounted coaxially and pivotably on the rotor axle such that the pitch adjustment devices are rotatable about the rotational axis of the rotor and relative to the rotor axle, to adjust the pitch of the rotor blades by rotating the pitch adjustment devices relative to the gondola and about the rotational axis of the rotor;
  centrifugal positioning devices for rotating the pitch adjustment devices about the rotor axis, which centrifugal positioning devices comprise:
    two or more centrifugal bodies which are each moveably connected to the rotor for movement between a first position near the rotational axis of the rotor and a second position at a distance from the rotational axis of the rotor;
    centrifugal positioning resilient devices which force the two or more centrifugal bodies in the position near the rotational axis, such that when the rotor is driven by the wind and the rotational speed of the rotor axle surpasses a threshold value, a centrifugal force acts on the two or more centrifugal bodies which forces the centrifugal bodies against the resilient force and from the first position towards the second position; and
    wherein the two or more centrifugal bodies are connected to the pitch adjustment devices such that when the centrifugal bodies move from their first position to their second position, they rotate the pitch adjustment devices about the rotational axis in a direction contrary to the rotational direction of the rotor;
  wherein the gondola is coaxially and pivotably connected via torsion positioning devices to the rotor axle, such that the gondola is pivotable about the rotational axis of the rotor and relative to the rotor axle, and such that—when the rotor is driven by the wind and the rotor axle is subjected to a torque as it drives the electrical generator, which torque is transferred via the torsion positioning devices from the gondola to the rotor axle—the torsion positioning devices are stretched due to the torque and the gondola rotates relative to the rotor axle in the rotational direction of the rotor and relative to the pitch adjustment devices to adjust the pitch of the rotor blades.

2. The wind turbine according to claim 1, wherein the torsion positioning devices enable a pitch adjustment of the rotor blades over a first angle and the centrifugal positioning devices enable a pitch adjustment of the rotor blades over a second angle.

3. A wind turbine according to claim 2, wherein the torsion positioning devices enable a pitch adjustment of the rotor blades over a first angle of 0-30 degrees relative to the blades in their initial position, and the centrifugal positioning devices enable a pitch adjustment of the rotor blades over a second angle of 30-90 degrees relative to the blades in their initial position.

4. The wind turbine according to claim 1, wherein the torsion positioning devices comprise pre-stressed torsion positioning resilient devices that force the gondola against a stop in a direction opposite the rotational direction of the rotor when driven by the wind.

5. The wind turbine according to claim 1, wherein the torsion positioning devices comprise digressive torsion positioning resilient devices.

6. The wind turbine according to claim 1, wherein the gondola has a central opening in which it receives the rotor axle, and wherein the torsion positioning devices comprise torsion positioning resilient devices which are mounted inbetween the rotor axle and the gondola to connect the gondola to the axle.

7. A wind turbine according to claim 6, wherein the torsion positioning resilient devices are a rubber ring.

8. The wind turbine according to claim 1, wherein the pitch adjustment devices comprise at least one gear rack extending in a circumferential direction about the rotational axis of the rotor, and the rotor blades each comprise a bevelled gear for cooperation with the at least one gear rack.

9. The wind turbine according to claim 1, wherein the centrifugal positioning devices comprise:

centrifugal bodies in the form of centrifugal arms, of which one end is pivotably connected to the rotor such that another end of the centrifugal arm is movable between the first position near the rotational axis and the second position at a distance from the rotational axis;

the resilient centrifugal positioning devices of the centrifugal positioning devices force the movable end of each centrifugal arm in the position near the rotational axis, such that when the rotor is driven by the wind and the rotational speed of the rotor axle surpasses a threshold value, a centrifugal force acts on the centrifugal bodies and forces the movable end of each centrifugal arm against the resilient force and from the first position towards the second position; and wherein the centrifugal arms are connected to the pitch adjustment devices such that when the movable ends of the centrifugal arms move from the first position to the second position, they rotate the pitch adjustment devices about the rotational axis in a direction contrary to the rotational direction of the rotor.

10. A wind turbine according to claim 9, wherein the one end of the centrifugal arms that is pivotably connected to the rotor is connected to the rotor axle of the rotor.

11. The wind turbine according to claim 1, wherein a rotor of the electrical generator is mounted on the rotor axle for cooperating with a stator of the electrical generator which is provided in the nacelle.

12. The wind turbine according to claim 1, wherein the wind turbine is of the down wind type and the mast has a first end, at which it is mountable in a holder for mounting the wind turbine to an object such that the mast is pivotable about a vertical axis, and a second end at which the mast supports the nacelle, and which second end is located at a radial distance relative to the vertical pivot axis.

13. A method for pitching rotor blades of a wind turbine comprising:
utilizing the wind turbine of claim 1 to pitch rotor blades of the wind turbine.

14. A wind turbine according to claim 1, wherein the wind turbine is of the down wind type.

15. A wind turbine according to claim 1, wherein the two or more centrifugal bodies are each moveably connected to the rotor axle.

* * * * *